United States Patent [19]

Cole et al.

[11] Patent Number: 5,617,862
[45] Date of Patent: Apr. 8, 1997

[54] METHOD AND APPARATUS FOR BEAMFORMER SYSTEM WITH VARIABLE APERTURE

[75] Inventors: Christopher R. Cole, Cupertino; Albert Gee, Los Altos; Laurence J. Newell, Saratoga, all of Calif.

[73] Assignee: Acuson Corporation, Mountainview, Calif.

[21] Appl. No.: 432,547

[22] Filed: May 2, 1995

[51] Int. Cl.⁶ ........................................... A61B 8/00
[52] U.S. Cl. ........................................... 128/661.01
[58] Field of Search ................... 128/660.08, 660.09, 128/661.01; 73/618, 619, 621, 624, 625, 626, 633, 641

[56] References Cited

U.S. PATENT DOCUMENTS

| | | | |
|---|---|---|---|
| 4,183,249 | 1/1980 | Anderson | 73/626 |
| 4,553,437 | 11/1985 | Luthra et al. | |
| 4,693,120 | 9/1987 | Robinson | 73/618 |
| 4,733,562 | 3/1988 | Saugeon | |
| 5,121,364 | 6/1992 | O'Donnell | |
| 5,269,307 | 12/1993 | Fife et al. | |
| 5,329,930 | 7/1994 | Thomas, III et al. | |

OTHER PUBLICATIONS

"Weighted Least-Squares Pulse-Shaping Filters With Application To Ultrasonic Signals" by Bengt Mandersson and Goran Salmonsson.

*Primary Examiner*—George Manuel
*Attorney, Agent, or Firm*—Brinks Hofer Gilson & Lione

[57] ABSTRACT

An ultrasonic scanner imaging system includes connections to one or more transducer arrays of at least M elements each, a transmit beamformer with N processors, and a receive beamformer with N processors. Separate transmit and receive multiplexers permit switching between transmit firings to any contiguous N-element transmit or receive aperture completely within a transducer array or straddled across two arrays. The transmit and receive apertures for a given firing may be independently placed and are not required to coincide. Such flexibility supports random aperture placement, sliding aperture acquisitions, and synthetic aperture acquisitions. The multiplexers also permit shorting adjacent transducer elements to enable 2N elements to be used in conjunction with N-channel transmit/receive beamformers. Beamforming to create synthetic apertures of $P*N<=M$ elements are accomplished with the multiplexing arrangement by coherently summing the receive beamformer pre-detected output from at least P acquisition firings.

51 Claims, 22 Drawing Sheets

Microfiche Appendix Included
(195 Microfiche, 19058 Pages)

ULTRASOUND BEAMFORMER SYSTEM

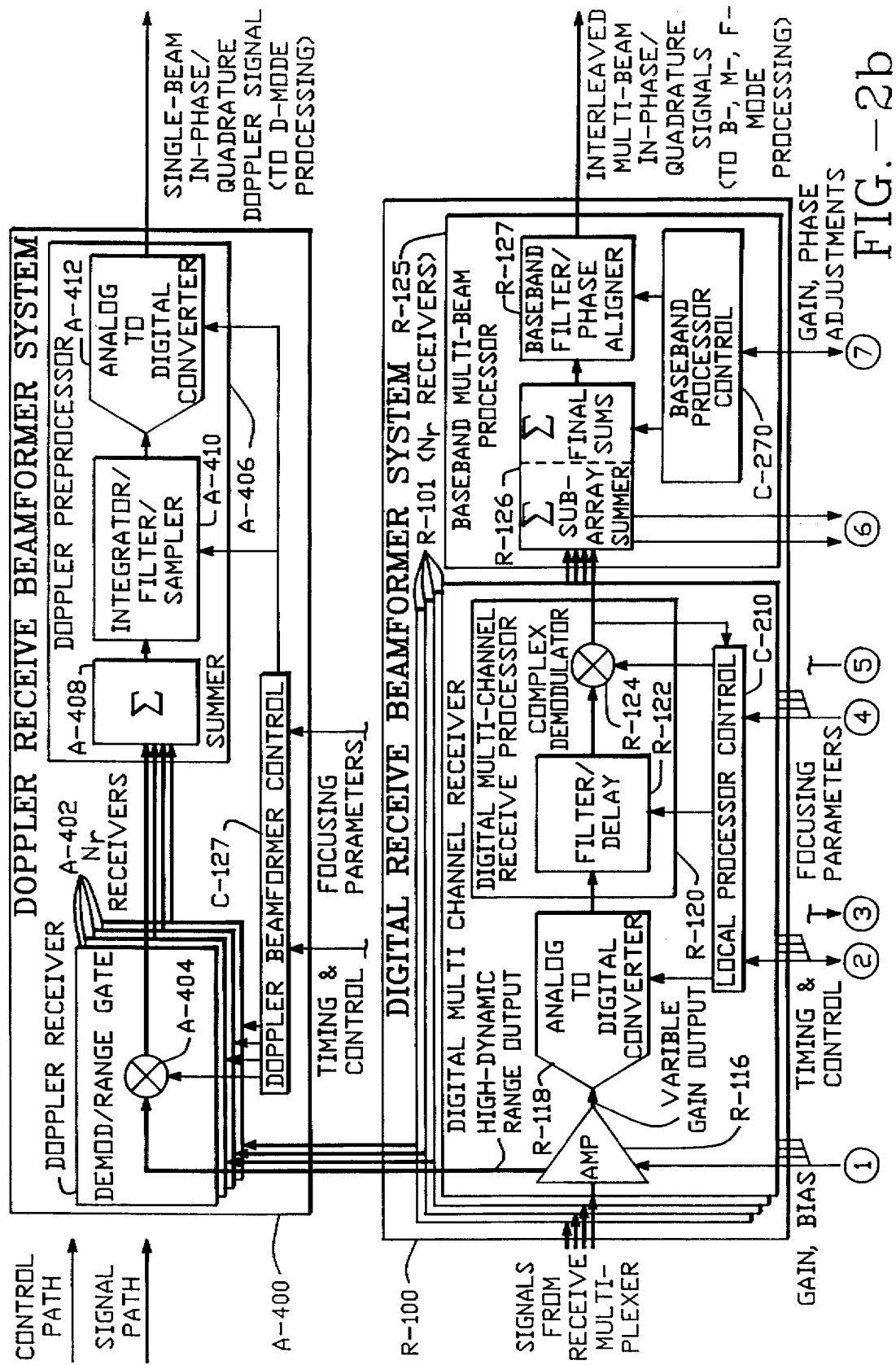

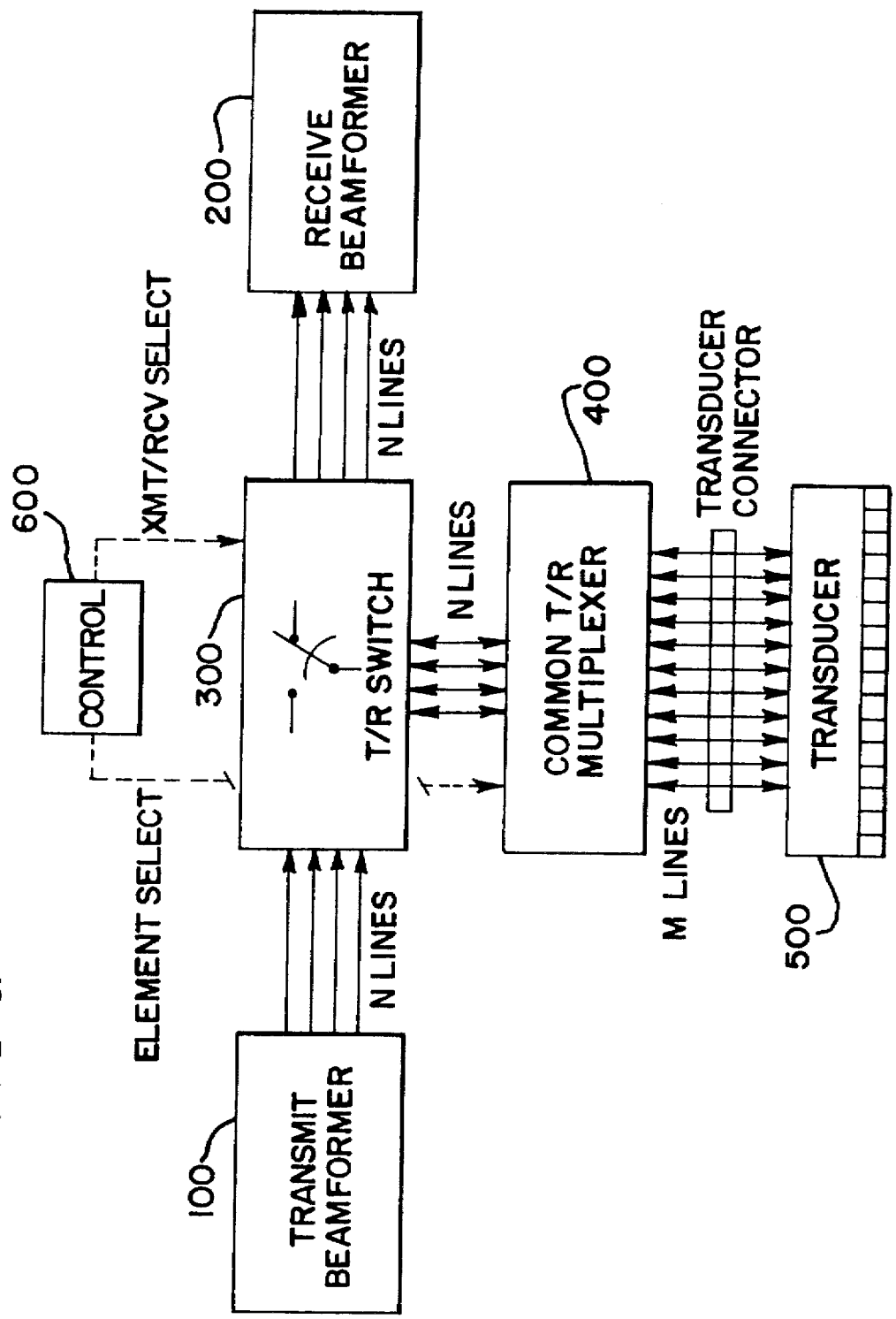

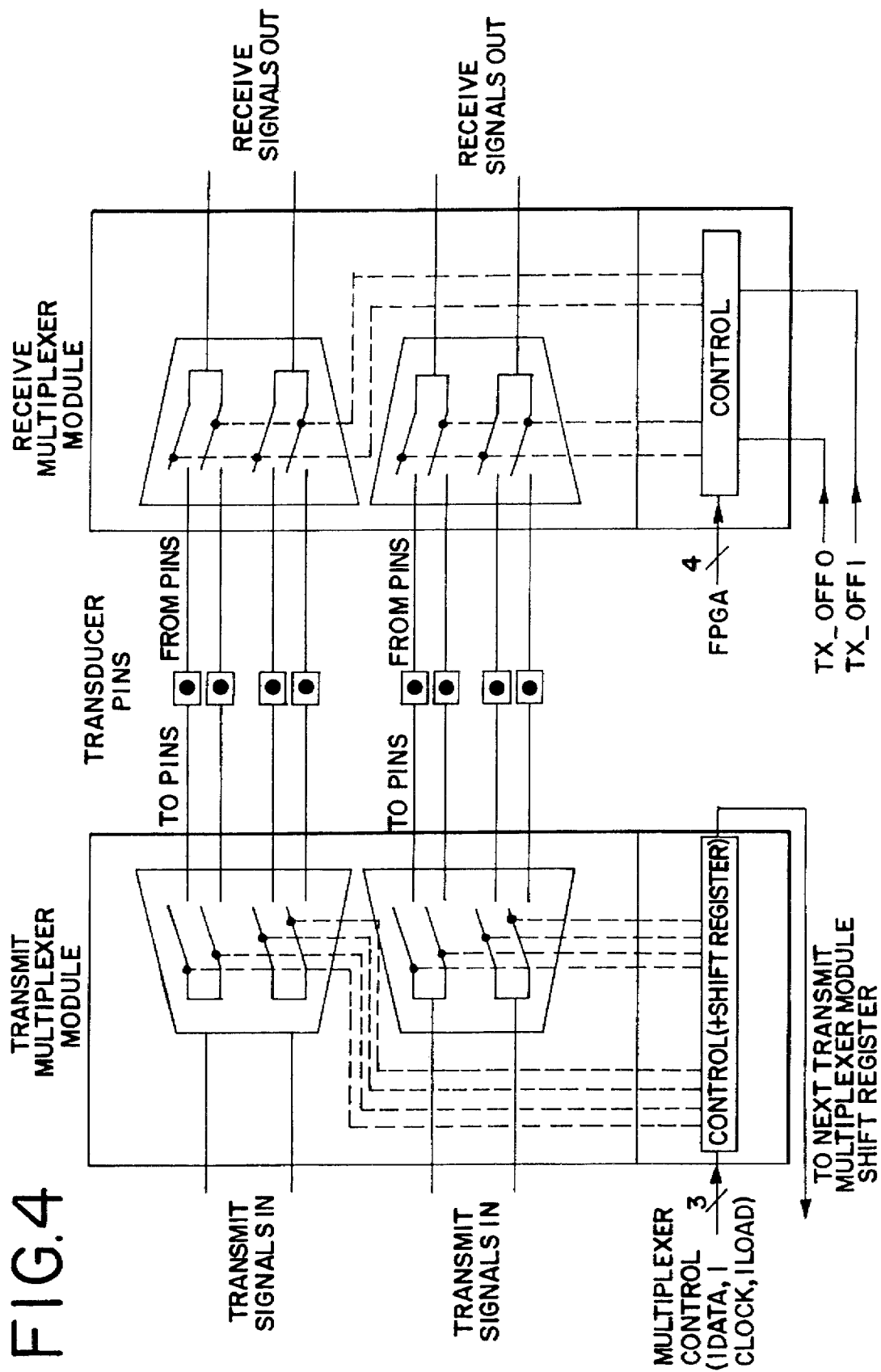

XDCR = TRANSDUCER
TX = TRANSMIT APERTURE
RX = RECEIVE APERTURE

XDCR = TRANSDUCER
 TX = TRANSMIT APERTURE
 RX = RECEIVE APERTURE

XDCR TRANSDUCER
TX = TRANSMIT APERTURE
RX = RECEIVE APERTURE

FIG. 15

FIG. 19
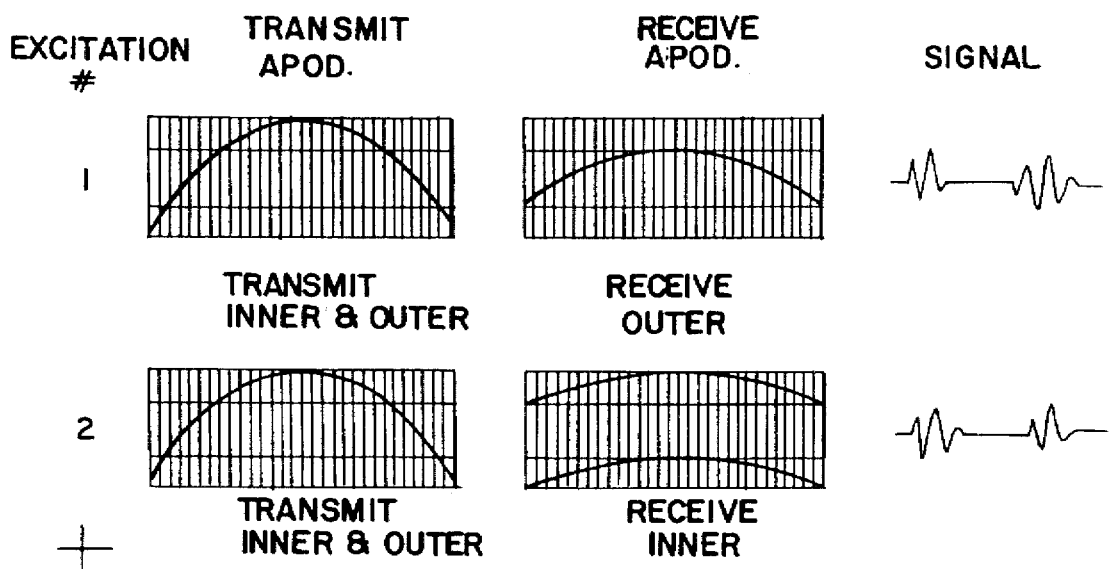
TRANSDUCER SCHEMATIC
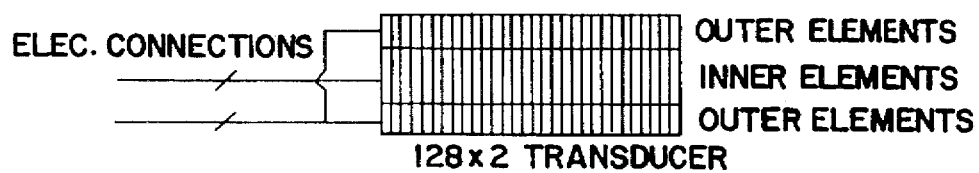

5,617,862

METHOD AND APPARATUS FOR BEAMFORMER SYSTEM WITH VARIABLE APERTURE

REFERENCE TO MICROFICHE APPENDIX

This application incudes a microfiche appendix of 195 sheets of microfiche having 19,058 frames. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

CROSS-REFERENCE TO RELATED APPLICATIONS

This application is related to:

a. METHOD AND APPARATUS FOR RECEIVE BEAMFORMER SYSTEM, J. Wright et al., U.S. Ser. No. 08/432,615;

b. METHOD AND APPARATUS FOR TRANSMIT BEAMFORMER SYSTEM, Cole et al., U.S. Ser. No. 08/432,056;

c. METHOD AND APPARATUS FOR FOCUS CONTROL OF TRANSMIT AND RECEIVE BEAMFORMER SYSTEMS, Gee et al., U.S. Ser. No. 08/432,544;

d. METHOD AND APPARATUS FOR DOPPLER RECEIVE BEAMFORMER SYSTEM, Maslak et al., U.S. Ser. No. 08/433,916;

e. METHOD AND APPARATUS FOR A BASEBAND PROCESSOR OF A RECEIVE BEAMFORMER SYSTEM, Wright et al., U.S. Ser. No. 08/434,160;

f. METHOD AND APPARATUS FOR BEAMFORMER SYSTEM WITH VARIABLE APERTURE, Cole et al., U.S. Pat. No. 08/432,547.

The above related applications are all commonly assigned with the present application, filed concurrently with the present application, and are incorporated herein by reference in their entirety.

The present application is also related to the following previously filed applications:

a. METHOD AND APPARATUS FOR REAL-TIME, CONCURRENT ADAPTIVE FOCUSING IN AN ULTRASOUND BEAMFORMER IMAGING SYSTEM, Wright et al., Ser. No. 08/286,528, filed Aug. 5, 1994;

b. METHOD AND APPARATUS FOR A GEOMETRIC ABERRATION TRANSFORM IN AN ADAPTIVE FOCUSING ULTRASOUND BEAMFORMER SYSTEM, Wright et al., Ser. No. 08/286,664, filed Aug. 5, 1994.

c. METHOD AND APPARATUS FOR COHERENT IMAGE FORMATION, filed Apr. 7, 1995 which is a continuation of Ser. No. 08/286,510, filed Aug. 5, 1994, now abandoned (Attorney Docket No. 5050/74).

BACKGROUND OF THE INVENTION

The present invention relates to a method and apparatus for a variable aperture ultrasonic scanner imaging system using separate transmit and receive multiplexers for independent placement of the transmit and receive apertures within the transducer array.

The number of processing channels in a commercial ultrasound imaging system is limited by the necessity of portability and the convenience of using standard electrical power outlets. In order to achieve higher lateral image resolution or better elevational resolution, transducer arrays today are manufactured with more elements than available processing channels on the imaging system. To access elements of such transducer arrays, multiplexers are used to connect a subset of the array elements to the available processing channels. One advantageous use of multiplexing is the creation of synthetic apertures, in which multiple firings and multiplexer selection of adjacent subarrays of the transducer array can be utilized to create the effect of beamforming over an effective aperture that covers the spatial extent of the combined subarrays. Such an increased aperture can result in an increased spatial resolution image. Thus, the number of elements in an array can be increased without a corresponding increase in the number of transmit or receive processing channels, but at the expense of decreasing the frame rate due to the multiple firings needed to create a synthetic aperture.

Prior art ultrasound scanners typically used transducer arrays with a number of elements that matched the number of processing channels used in the transmit and receive beamformers. When a transducer array was used for both transmission and reception, a transmit/receive (T/R) electronic switch was simply used to switch after firing from the transmitters to the receivers in order to start the receive beamforming as the echoes returned. A prior art system is illustrated in FIG. 3a. When larger transducer arrays with more elements than processing channels were fabricated, the original scanner designs were simply modified by the placement of a bidirectional multiplexer 400 in the signal path between the transducer connector and the T/R switch 300. A beam could then be synthesized using signals from the whole transducer aperture by a process of multiple firings and multiplexer repositioning of either the transmit aperture, receive aperture, or both before each firing.

SUMMARY OF THE INVENTION

The present invention provides a method and apparatus for a variable aperture ultrasonic scanner imaging system. The novel system comprises separate transmit and receive multiplexers. This permits independent placement of transmit and receive apertures within the transducer array. The multiplexers provide for switching among connections to one or more transducer arrays of at least M elements each, connections to a transmit beamformer with N transmitter processors, and connections to a receive beamformer with N receiver processors.

The separate transmit and receive multiplexers permit switching between transmit firings to any contiguous N-element transmit or receive aperture completely within a transducer array or straddled across two arrays. The transmit and receive apertures for a given firing may be independently placed and are not required to coincide. Such flexibility supports random aperture placement, sliding aperture acquisitions, and synthetic aperture acquisitions. The multiplexers also permit shorting adjacent transducer elements to enable 2N elements to be used in conjunction with N transmit/receive processors. Beamforming to create synthetic apertures of $P*N \leq M$ elements are accomplished with the multiplexing arrangement by coherently summing the receive beamformer pre-detected output from at least P acquisition firings.

In one aspect of the invention, switching means and programmability to control synthetic aperture ultrasonic signal acquisition is provided to increase the number of transducer elements used by an ultrasonic scanner imaging system without increasing the number of transmit or receive processing channels. A scan line buffer memory and in-phase/quadrature (I/Q) summer placed after a baseband processor with amplitude/phase coherence adjustments to form the resulting synthetic aperture scan line is a component of the variable aperture invention when used in conjunction with synthetic aperture acquisitions. Placement of the memory and summer after the baseband processor is an improvement over the prior art which places these means at the output of the receive beamformer. In further contrast to the prior art which normally uses no overlap between the transducer subarrays used to form the synthetic aperture, the switching means of the invention permits a slight overlap of the subarrays in order to support the inter-subarray phase correlation measurements needed to support adaptive focusing operations.

In another aspect of the invention, switching means and programmability to control random aperture ultrasonic signal acquisition is provided. Random aperture is applicable to transducers which have a large number of elements and for which automated placement of the position of an active aperture smaller than the full transducer array aperture that is not blocked by obstructions such as ribs in order to obtain the best imagery is desirable. Another application is compound scanning for the purposes of speckle reduction in which randomized variations in the aperture position are averaged.

In another aspect of the invention, switching means and programmability to support sliding aperture ultrasound signal acquisition is provided. Sliding aperture acquisition is used to create linear scan formats in which the active transmit and receive apertures are placed in successive positions stepped along a linear transducer array in order to stay centered relative to the origin of each scan line composing a linear scan.

In another aspect of the invention, switching means and programmability to support elevational transducer acquisitions is provided. Transducer arrays which contain linear arrays on either side of a central linear array may be used to improve the elevational beam response during lateral scan acquisitions.

In another aspect of the invention, switching means and programmability to support adjacent element shorting is provided. This enables use of the full aperture on some lambda/4-spacing transducer arrays. For example, a 128-element oversampled lambda/4-spacing transducer array may be used with a 64-channel imaging scanner, which effectively becomes a 64-element lambda/2-spacing transducer array using the shorting feature of the invention.

In a further aspect of the invention, switching means to support second harmonic imaging transducers is provided. Such transducers are useful for applications in which contrast agents are employed.

In a further aspect of the invention, coupling means are added between the transmit and receive multiplexers and a the transducer to enable special per-element calibration signal acquisition in order to calibrate separately the transmit and receive analog path to and from each element of the transducer array.

BRIEF DESCRIPTION OF THE DRAWINGS

FIGS. 2b and 2c taken together depict detailed block diagrams of the ultrasound beamformer systems of FIG. 2a.

FIG. 4 is a functional diagram of modules for the transmit multiplexer and the receive multiplexer.

FIG. 15 illustrates one possible sliding aperture pattern achievable by the multiplexer configuration of FIG. 6.

FIG. 19 depicts preferred transmit and receive aperture patterns selected by the transmit and receive multiplexers of the invention for a two-excitation-event elevational transducer synthetic aperture acquisition.

DETAILED DESCRIPTION OF THE PRESENTLY PREFERRED EMBODIMENTS

Figure 3B:
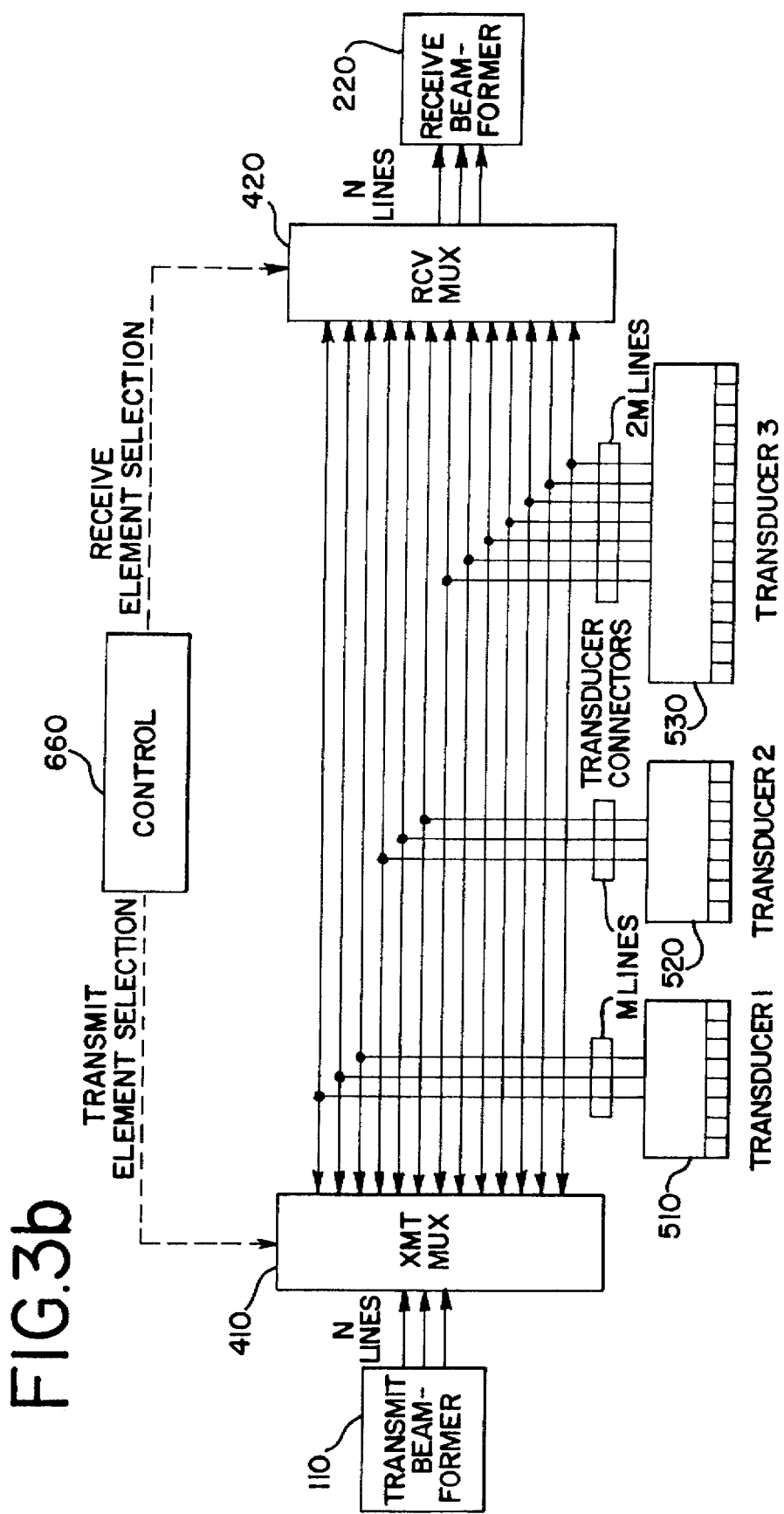
FIG. 3a depicts a block diagram of a prior art variable aperture system while 3b depicts a block diagram of a preferred embodiment of a variable aperture system invention for the ultrasound imaging system of FIG. 2.

As illustrated in the Figures, particularly FIG. 3b, the present invention uses separate transmit and receive multiplexers. Preferably, programmable electronic switching is provided to establish the connectivity between the transmit and receive beamformer processing channels and the elements of a transducer array. A further attribute of this invention is the capability to electronically and rapidly switch among several, preferably up to four, different transducers as well as switch to specific elements within each transducer array. Preferred transmit and receive beamformer systems that work in conjunction with the transmit and receive multiplexers of the present invention are described below in Section A although the invention is operable with other beamformer structures encountered in the ultrasound scanner art. Section B describes the specific apparatus and operation of the present invention.

A. Overview of the Preferred Beamformer System Architecture

1. Ultrasound Signal Description

Figure 1A:
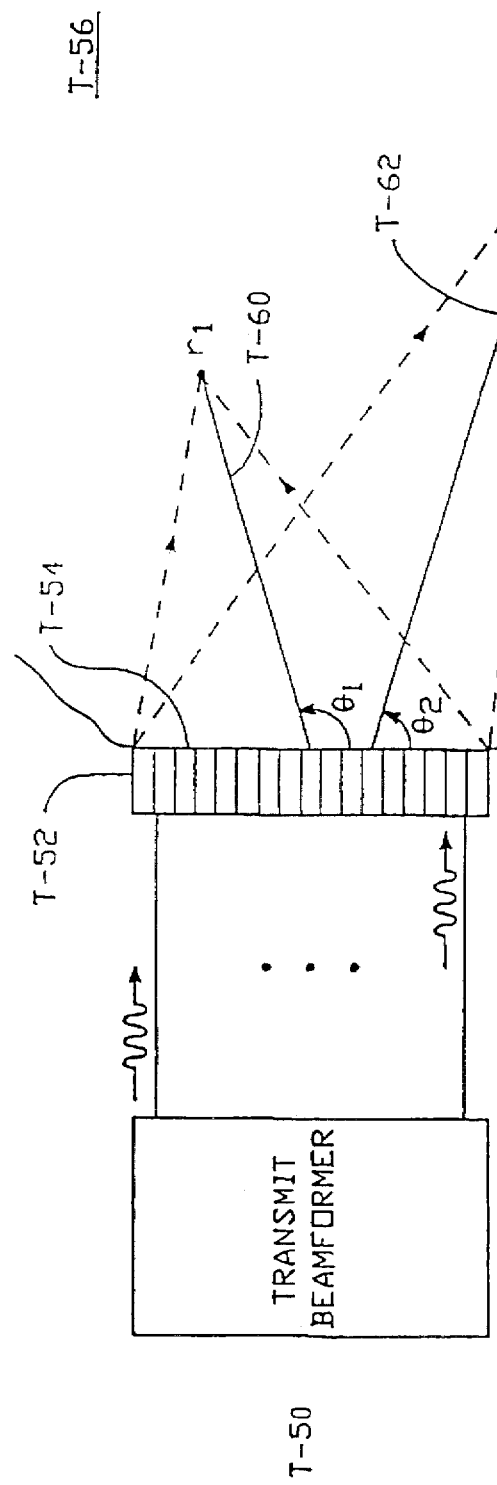
FIGS. 1a and 1b depict the transmission and reception of ultrasound beams to and from body tissue.
Figure 1B:
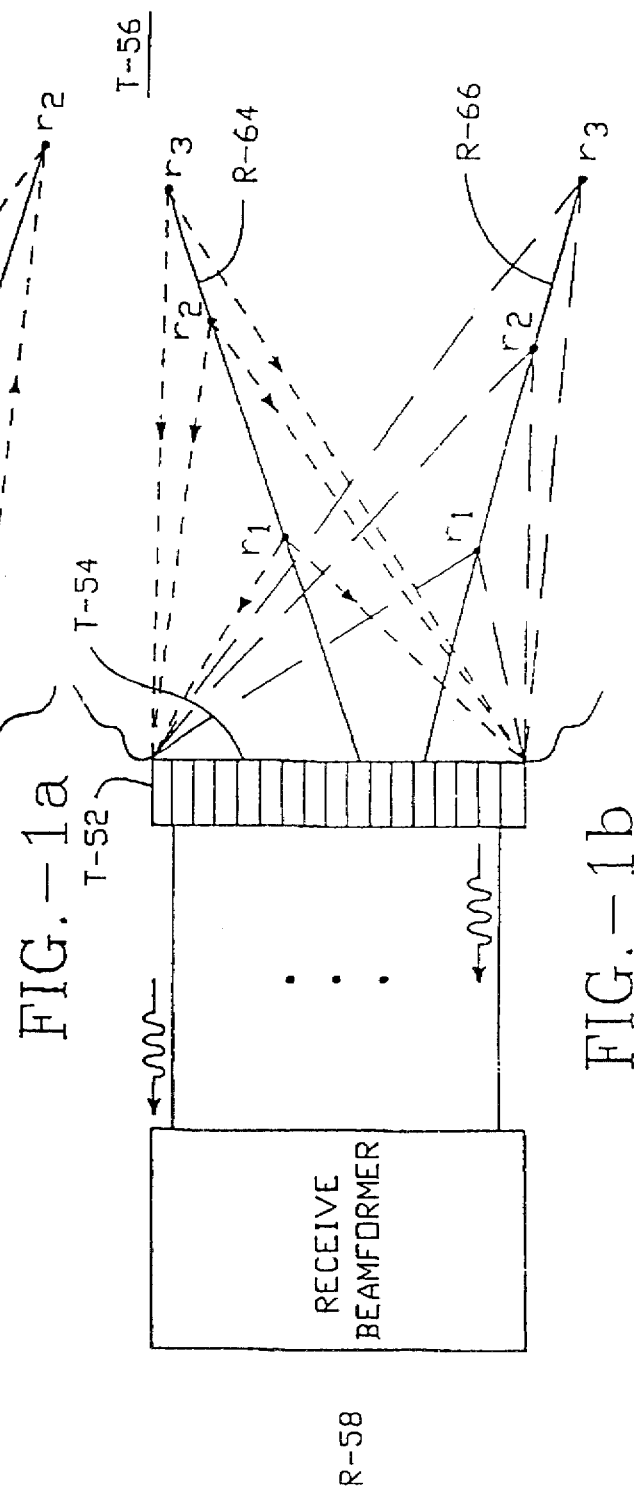

Referring now to the drawings, FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1, r_2, r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System

Figure 2A:
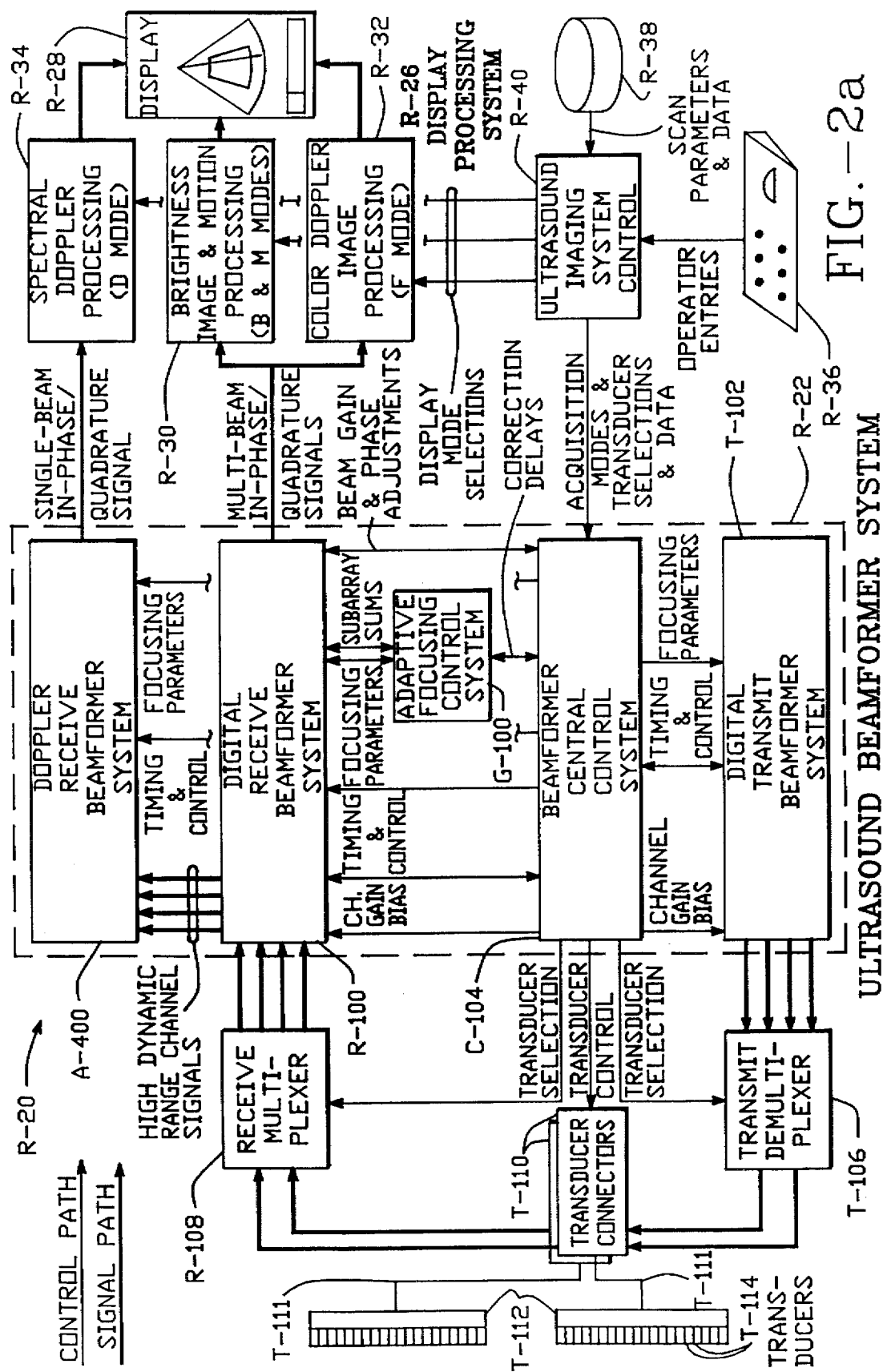
FIG. 2a depicts a block diagram schematic of an ultrasonic medical imaging system, including the variable aperture system of the invention in combination with transmit and receive beamformer systems.
Figure 2C:
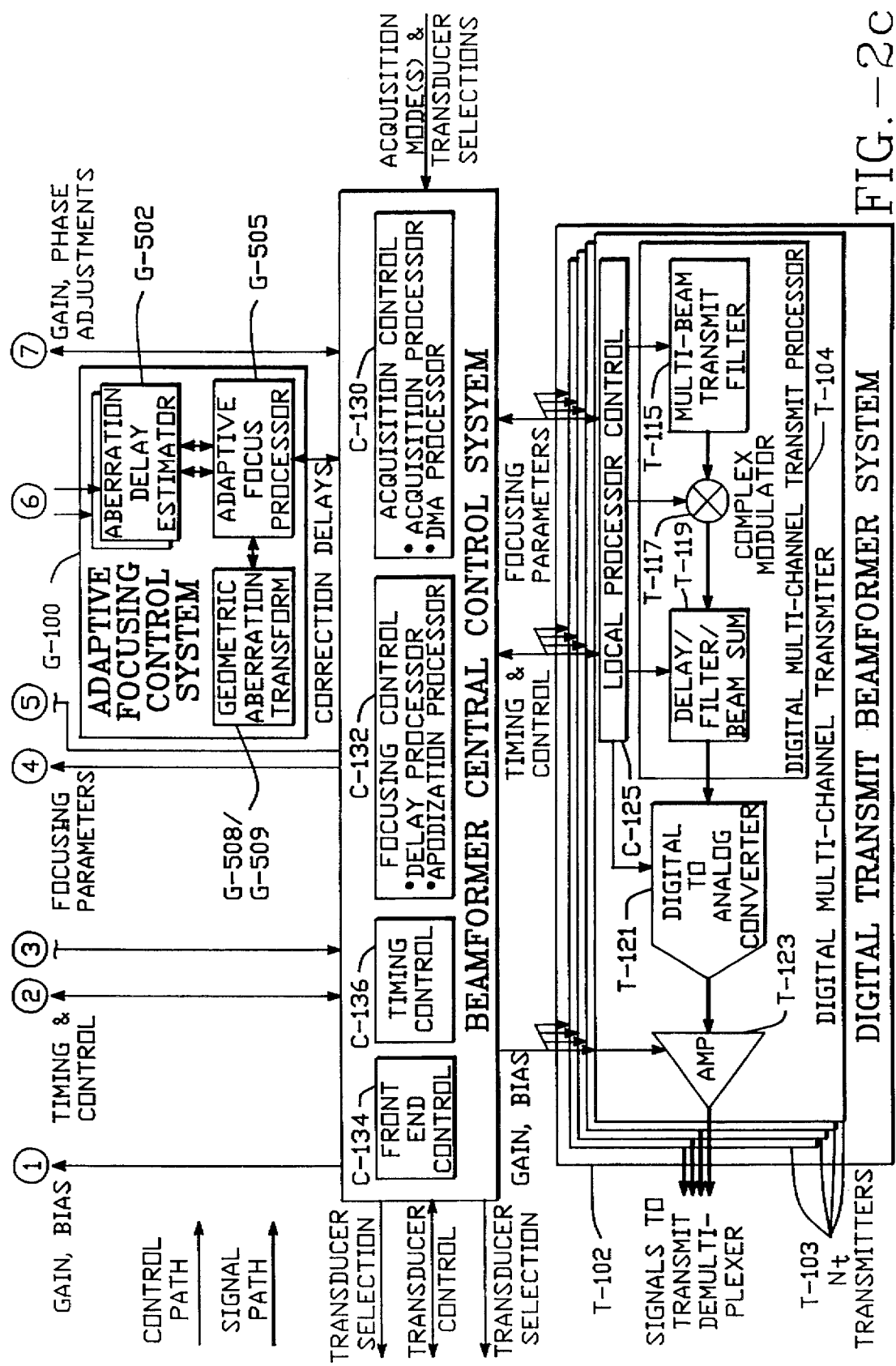

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40. As used herein, the term ultrasonic refers to frequencies above the range of human hearing. However, the transducer arrays T-112 are optimized for frequencies typically within the range of 2–10 MHz.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100, (5) Doppler receive beamformer system A-400, (6) baseband multi-beam processor R-125, and (7) coherent sample synthesizer S-100. These systems are depicted as functional block diagrams. The blocks are abstracted from the actual implementation of a preferred embodiment in order to better illustrate the signal processing functions performed.

In FIGS. 2a, 2b, 2c, the control signals are communicated over the light lead lines while the signal paths are depicted with heavy lead lines.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for flow imaging, and (3) spectral Doppler processor R-34 for wide dynamic nonimaging Doppler velocity vs. time displays. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

The transducer array T-112 is interchangeable with a variety of different kinds of transducer arrays, including but not limited to linear, curved, curvilinear and annular transducer arrays. A variety of transducer array shapes and frequencies are desirable in order to satisfy the requirements of a variety of different clinical settings. However, the transducer arrays T-112 are typically optimized for frequencies within the range of 2–10 MHz. The medical ultrasound system R-20 performs the three major functions of driving the ultrasonic transducer array of elements T-114 to transmit focused ultrasound energy, receiving and focusing backscattered ultrasound energy impinging on the transducer array T-114, and controlling the transmit and receive functions to scan a field of view in scan formats including (but not limited to) linear, sector or Vector® format.

3. Digital Transmit Beamformer System

The digital transmit beamformer T-102 (FIG. 2c) is the subject of the above-identified application entitled: METHOD AND APPARATUS FOR TRANSMIT BEAMFORMER SYSTEM. In a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System

The digital receive beamformer R-100 (FIG. 2b) is the subject of the above-identified application entitled: METHOD AND APPARATUS FOR RECEIVE BEAMFORMER SYSTEM.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together with summer R-126 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The digital multi-channel receivers R-101 communicate with summer R-126 where the signal samples associated with each beam from each receive processor are summed to form final receive scan line samples, and the resulting complex samples provided to baseband processor R-125. The exact functioning and composition of each of these blocks will be more fully described below.

A local or secondary control C-210 is associated with each digital multi-channel receiver R-101. Local processor control C-210 is controlled by central or primary control C-104 and provides timing, control and parameter values to each said receiver R-101. The parameter values include focusing time delay profiles and apodization profiles.

5. Doppler Receive Beamformer System

The Doppler receive beamformer system A-400 for wide dynamic range, nonimaging Doppler acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of a co-pending patent application entitled: METHOD AND APPARATUS FOR DOPPLER RECEIVE BEAMFORMER SYSTEM.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

The present beamformer system R-22 advantageously combines an imaging digital receive beamformation system R-100 and the nonimaging Doppler receive beamformation system A-400 in a manner which uses the same digital transmit beamformation system T-102 and the same transducer array. This arrangement allows the digital receive beamformation system R-100 to be optimized for imaging modes such as B-mode and color Doppler imaging, and therefore has high spatial resolution, while the accompanying Doppler receive beamformation system has a wide dynamic range and may be optimized for use in acquiring signals for nonimaging Doppler processing.

6. Beamformer Central Control System

The beamformer central control system C-104 of the present invention controls the operation of the digital transmit beamformer system T-102, the digital receive beamformer system R-100, the Doppler receive beamformer system A-400, the adaptive focusing control system G-100, and the baseband processor R-125. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sees the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated to the local processor controls as a profile of values across the transducer aperture where the delay and apodization data expansion in range is completed to per-transducer-element, per-sample, per-beam values.

7. Adaptive Focusing Control System

Adaptive focusing control system G-100 provides for real time concurrent adaptive focusing. Adaptive focusing control system G-100 is comprised of an adaptive focus processor G-505 which provides focus correction delay values to the focus control C-132 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in co-pending patent application entitled: METHOD AND APPARATUS FOR REAL TIME, CONCURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in G-508/509. G-508/509 retrieves values from the delay table according to look-up rules of the geometric aberration transform to form focusing delay correction profiles across the aperture valid for depths, scan geometries, and acquisition modes other than the depth, scan geometry, and mode for which aberration correction values were measured. The geometric aberration transform device G-508/509 is the subject of co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

8. Baseband Processor System

The baseband processor R-125 provides for filtering, and receive-scan-line-to-receive-scan-line (beam-to-beam) amplitude and phase adjustments as discussed herein and in the above-referenced patent application entitled: METHOD AND APPARATUS FOR A BASEBAND PROCESSOR OF A RECEIVE BEAMFORMER SYSTEM.

The baseband processor R-125 additionally includes a baseband filter, a complex multiplier, and a baseband processor control which controls the operation of the baseband filter and complex multiplier. The baseband processor control is controlled by central control C-104.

9. Coherent Sample Synthesizer System

The coherent sample synthesizer system S-100 (FIG. 2a) is the subject of the above-identified application entitled: METHOD AND APPARATUS FOR COHERENT IMAGE FORMATION.

This system exploits the multi-beam transmit and multi-beam receive capability of the invention to acquire and store coherent (pre-detection) samples of receive beam data along actual scan lines and to perform interpolation of the stored coherent samples to synthesize new coherent samples at new range locations along existing scan lines or along synthetically-created scan lines. Both acquired and synthesized samples are passed to the display processing system R-26.

10. Transmit and Receive Multiplexers

The connectivity between the transducer array elements T-114 and the processors T-103, R-101, A-402 of the digital transmit, digital receive, and Doppler receive beamformer systems is established through a transmit demultiplexer T-106 and a separate receive multiplexer R-108, as shown in FIG. 2a. The multiple-transducer multiplexer configuration shown in FIG. 2a permits selection of transmit and receive apertures lying entirely within a single transducer array or straddling across two transducer arrays. The two multiplexers are independently controlled by the beamformer central control system C-104 and may be programmed to support a number of acquisition modes, including sliding aperture and synthetic aperture modes. The multiplexers and their connectivity are the subject of this invention.

B. Variable Aperture System

The present invention achieves a completely variable receive aperture and variable transmit aperture using an arrangement illustrated such as that in FIG. 3b. As illustrated, a unidirectional transmit multiplexer 410 and a separate unidirectional receive multiplexer 420 are used. This arrangement eliminates the need for a T/R switch. Using separate transmit and receive multiplexers improves upon the prior art systems that use a bidirectional multiplexer coupled with a T/R switch (FIG. 3a) by avoiding the large switching transients associated with this approach.

A control 660 ensures that the receive multiplexer switch of a given transducer element is open during transmit operations on that element, and conversely, that the transmit multiplexer switch of an element is open during receive operations on that element. Transmit and receive multiplexers are connected to several transducers through transducer connectors. This arrangement does not require that the number of elements in each transducer be identical. For example, FIG. 3b shows one configured arrangement in which two transducers 510 and 520 of M elements each and one transducer 530 of 2M elements are available for multiplexing. A typical value of M is 128 elements. The transmit multiplexers 410 and receive multiplexers 420 select N of the available 4M elements for connection to the transmit beamformer 110 processing channels and to the receive beamformer 220 processing channels. Typical values of N are 128 channels and 64 channels. Also, although the number of transmit and receive channels are illustrated here to be identical, the approach is amenable to unequal number of transmit and receive channels.

An arrangement such as that illustrated in FIG. 3b is not only able to synthesize a scan line for an M-element aperture using N (<M) processing channels and a number of sequential firings, but is also able to perform sliding aperture and random aperture selection of N contiguous elements within or across transducer connector boundaries on sequential ultrasound scan lines. Both transmit and receive apertures may be selected independently. Adjacent element pair or adjacent element quad shorting is also supported in which the multiplexer switches two or four elements, typically adjacent elements, into one signal path to the transmit or receive beamformer processors.

The basic multiplexer building blocks are preferably sized for electronic implementation as module groupings of eight high-voltage switches each. The electronic functionalities of a single transmit multiplexer module and a single receive multiplexer module are illustrated by FIG. 4. (Specific transducer element assignments are not shown at this level.) Each transmit multiplexer module has eight switches, and contain two groups of dual, two-channel, 1-to-2 multiplexers; each most closely resembles a DPDT switch although each single switch can be independently controlled. Under control of the multiplexer controller 128 in FIG. 7, the transmit multiplexers can switch all of the available N transmit channels to any continuous N-element aperture positioned either within a single transducer connector or straddling the boundary between transducer connectors. The transmit transducer switching is rapid enough to allow the transmit aperture to be moved to any new position on a scan-line-by-scan-line basis.

Figure 5:
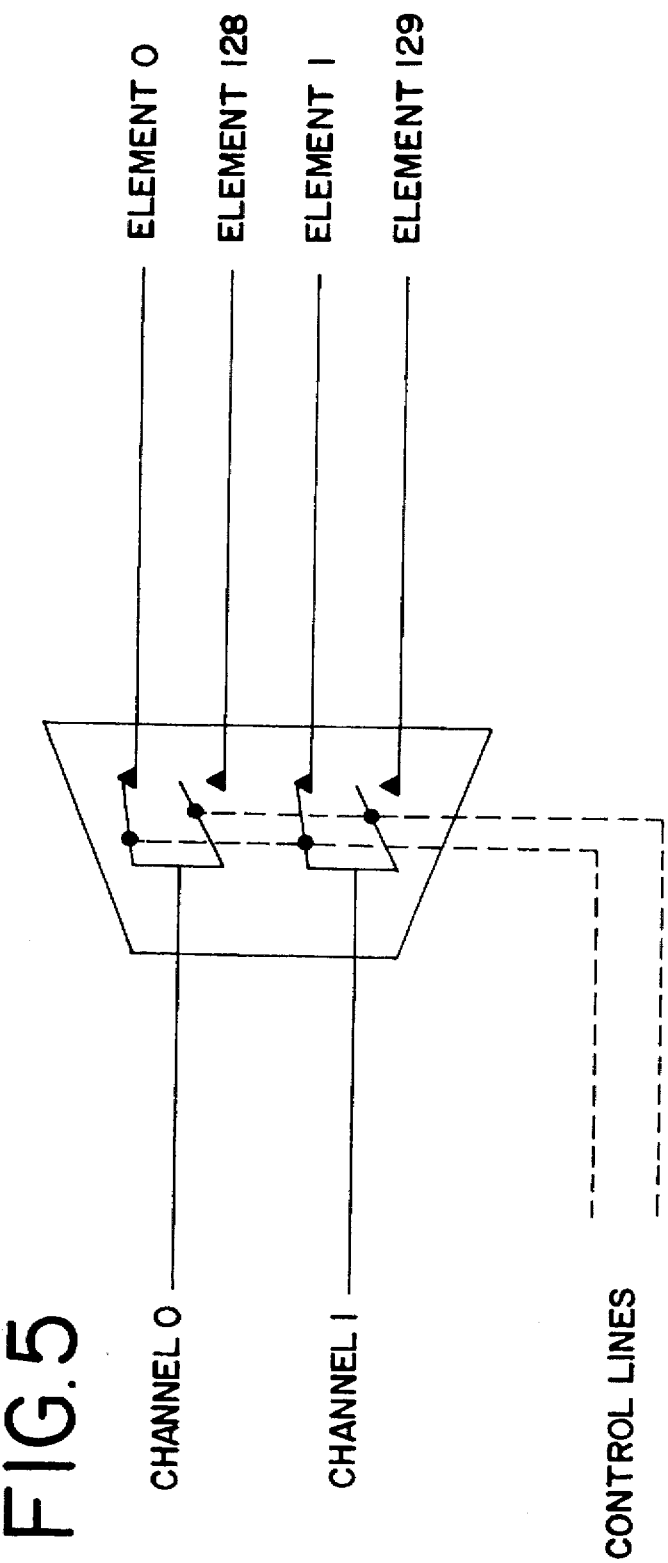
FIG. 5 illustrates a preferred embodiment of the control detail for the basic multiplexer building block of this invention. Shown is the connectivity for N=128-channel beamformer system and a M=256-element transducer.

The receive multiplexer performs a similar function for the signals received from the transducer array and is also configured with eight switches, and also contains two groups of dual, two-channel 2-to-1 multiplexers which can be set independently of any transmit multiplexer. The control hardware only supports switching of elements as shown in FIG. 5.

Figure 6:
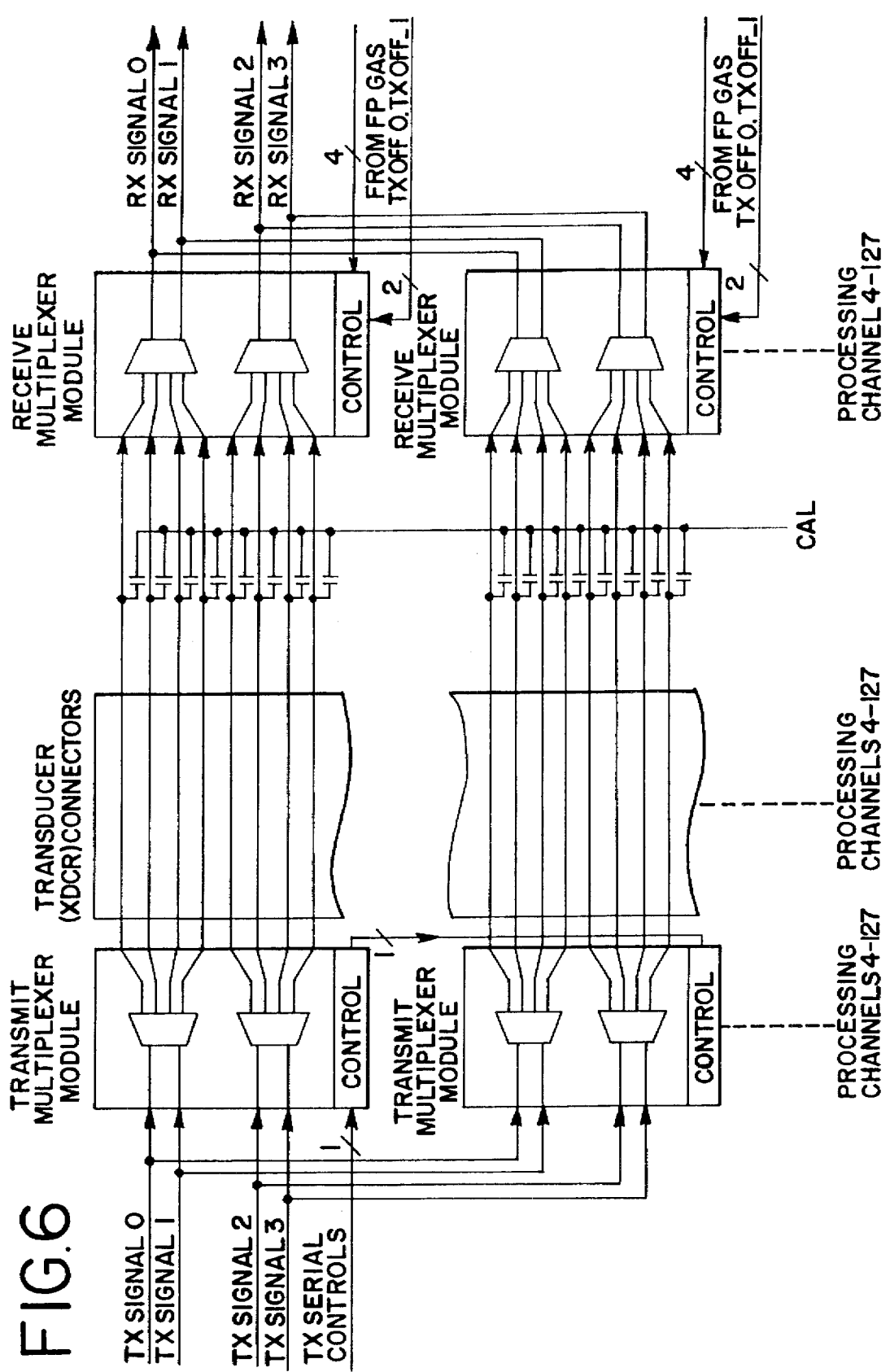
FIG. 6 is a preferred configuration for transmit and receive multiplexers for a N=128 processing channel imaging system with four 128-element transducer connections (M=128×4).

FIG. 6 shows one preferred configuration of the independent transmit and receive multiplexers for a 128 channel beamformer system that uses 64 transmit multiplexer modules and 64 receive multiplexer modules.

Figure 7:
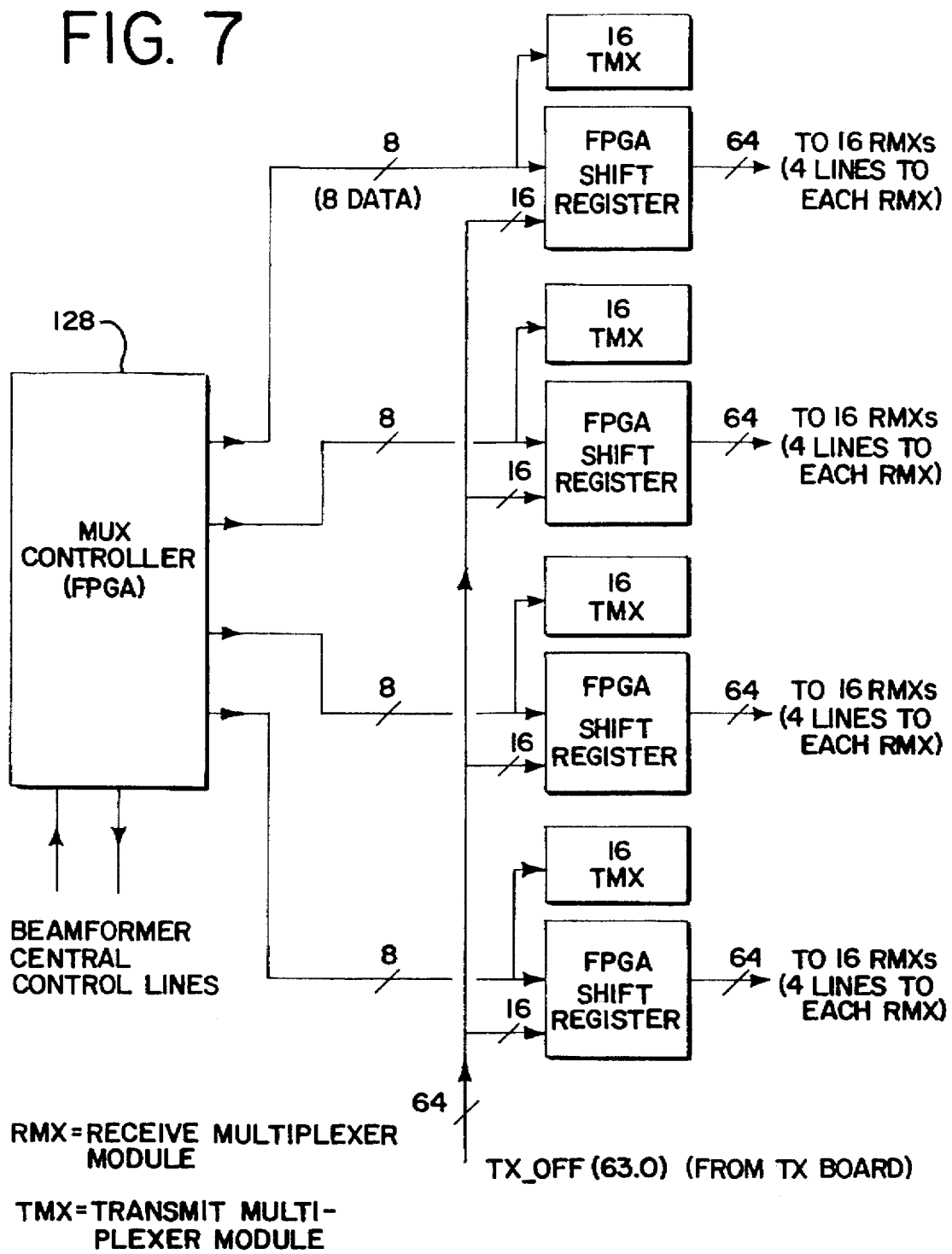
FIG. 7 depicts a block diagram of the multiplexer control apparatus.

The transmitter-off signal lines, designated as TX_OFF, come from the transmitters (see FIG. 2b) and when asserted, open up the receive multiplexers during transmit, thereby preventing accidental turnon of a receiver while a transmit operation is underway on that transducer element shared by the common transmit and receive multiplexer signal path connecting to the element. There is one TX_OFF signal line for each pair of receive multiplexer channels. The multiplexer control apparatus for the multiplexers is shown a as a block diagram in FIG. 7. Switch settings regarding a scanning mode are downloaded from the main ultrasound system controller to the multiplexer control, where it is clocked out to the local control of the individual transmit and receive multiplexer modules. The data is then enabled just before start-of-transmit, settling time passes, and then the transmit can occur. Once a particular channel pair has finished transmitting, TX_OFF is asserted and, after another settling interval, return echoes on those two channels can be received. In the preferred embodiment, the multiplexer (mux) controller is field programmable gate array (FPGA). Shown in FIG. 7 is a 128-element configuration in which there are 64 TX_OFF lines, meaning the 128 active elements can only be switched in groups of two.

For system calibration, each transducer array pin is connected by a capacitor to a common calibration node line. There is a separate calibration node line per transducer connector in the system, so that each transducer connected to the system can be calibrated sequentially. For transmit calibration, each transmit channel is switched on individually in a sequential channel-by-channel manner and the resulting signal from each individual channel at a transducer connector pin is coupled through the calibration node line where it is buffered and amplified and sent to the receive beamformer for processing. One receiver (receive channel) in the receive beamformer is selected as a common processing path for calibrating all transmit channels. By firing each of the transmit channels in turn and comparing the signals on the same receive channel, it is possible to calibrate out amplitude and phase differences among transmit channels. For receive calibration, the calibration node is driven by a common signal from a receiver calibration signal generator which has been set to a calibrated level, resulting in all of the transducer connector pins being driven simultaneously. All of the receive channels then receive this common inserted signal and will process them through the receive beamformer; at either the output of each individual receive channel or the output of the beamformer, the magnitude level and phase responses are measured and used to provide a calibration adjustment for each receive channel. Calibration is performed separately for each connected transducer and each element of a transducer.

C. Variable Aperture System Capabilities

1. Multiplexer Configuration Connectivity

Figure 8:
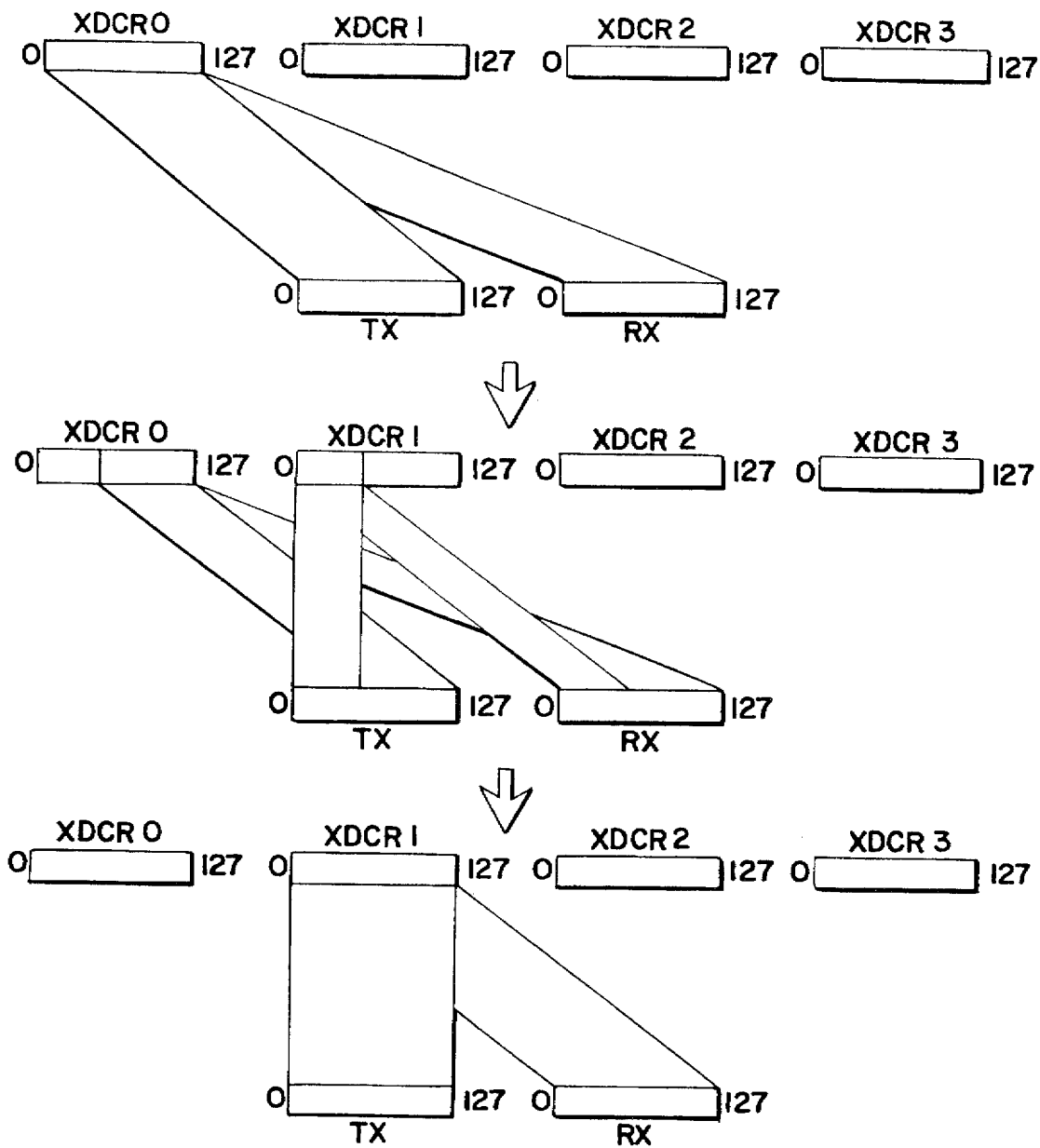
FIG. 8 illustrates an embodiment of multiplexer connectivity patterns of the configuration of FIG. 6.

FIG. 6 illustrates one preferred configuration of independent transmit and receive multiplexers for an N=128 processing channel beamforming system and four M=128 element transducers. Two transmit and receive module pairs control four channels in this configuration. FIG. 8 provides examples of the variable aperture system multiplexer capability for this configuration. The multiplexers can switch the 128 transmit and 128 receive channels to any one of the available transducers and can place a 128-channel-wide aperture across transducer boundaries, as shown in FIG. 8. Although this figure shows identical transmit and receive aperture positions, the configuration of FIG. 6 permits independently positioned transmit and receive apertures.

Figure 9:
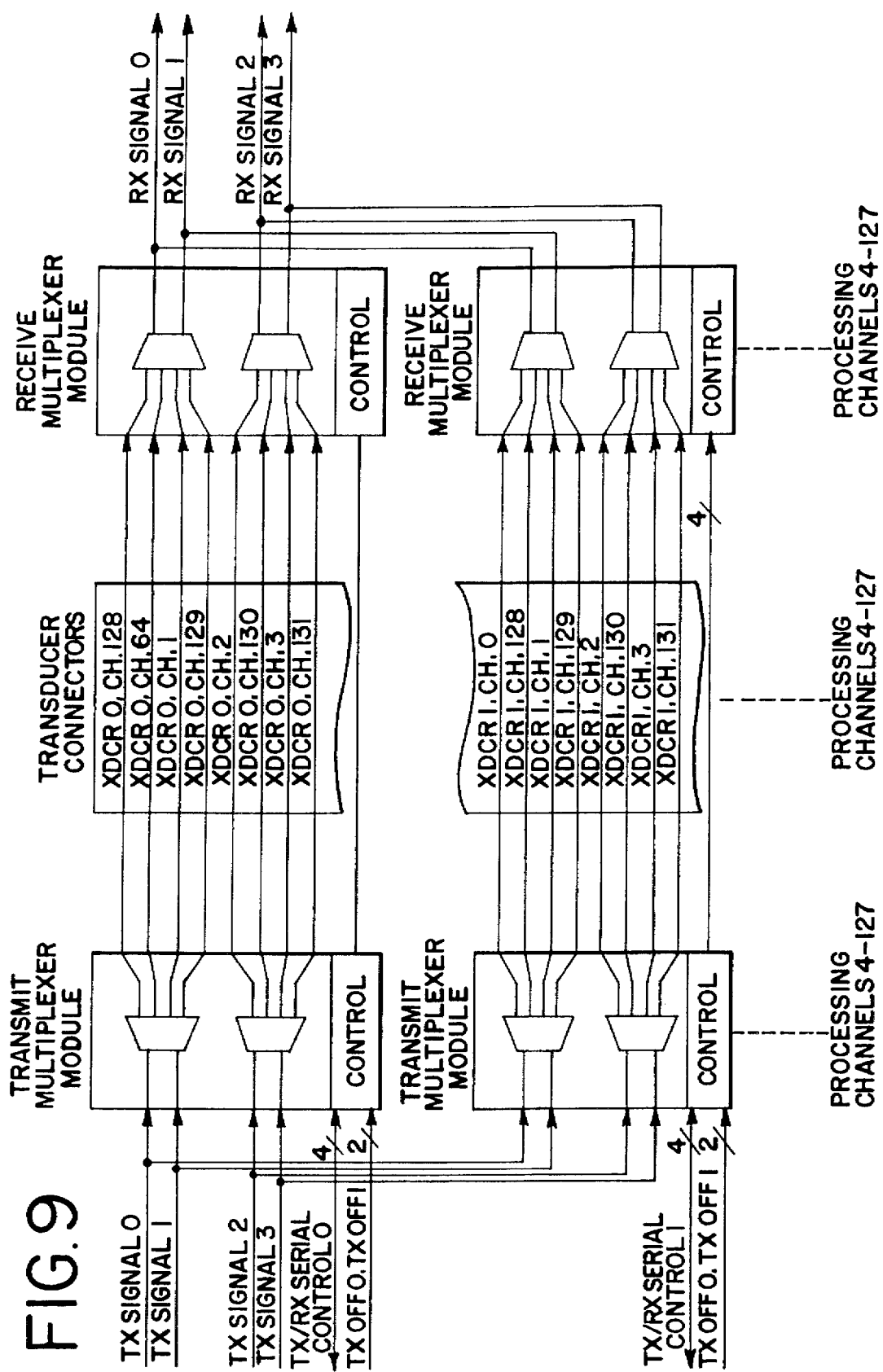
FIG. 9 is a preferred configuration for transmit and receive multiplexers for a N=128 processing channel imaging system and two 256-element transducer connections (M=256×2).

FIG. 9 depicts another preferred configuration of independent transmit and receive multiplexers for an N=128 processing channel beamforming system and two M=256 element transducers. The calibration connections have been omitted for clarity. Although this figure shows identical transmit and receive aperture positions, the configuration of FIG. 9 permits independently positioned transmit and receive apertures.

Figure 10:
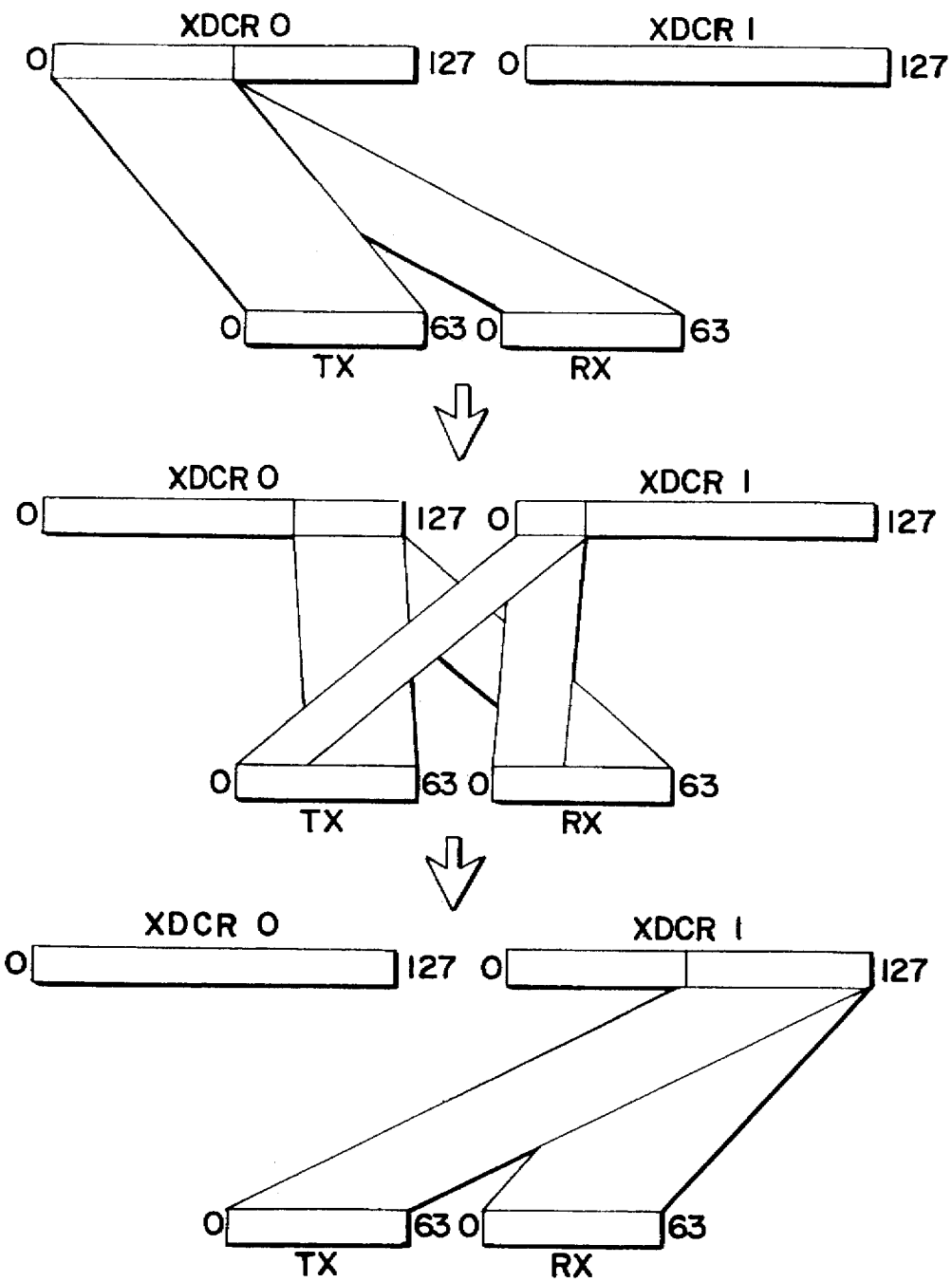
FIG. 10 illustrates an embodiment of multiplexer connectivity patterns of the configuration of FIG. 9.

FIG. 10 provides examples of the variable aperture system multiplexer capability for this configuration. The multiplexers can switch the 128 transmit and receive channels to any one of the available transducers and can place a 128-channel-wide aperture across transducer boundaries as shown in FIG. 10.

Figure 11:
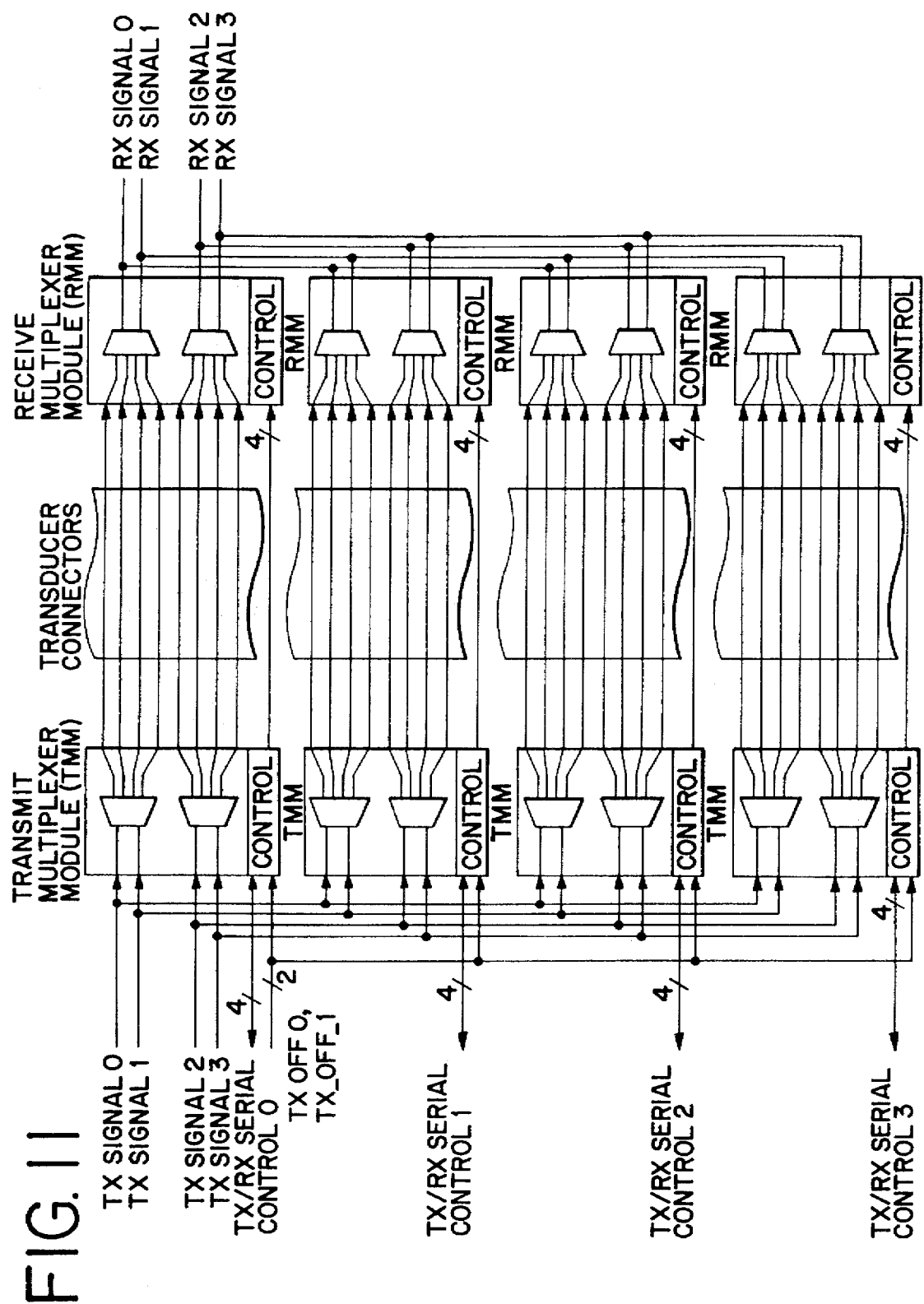
FIG. 11 is a preferred configuration for transmit and receive multiplexers for a N=64 processing channel imaging system with two 128-element transducer connections and adjacent element shorting capability (M=128×2).
Figure 12:
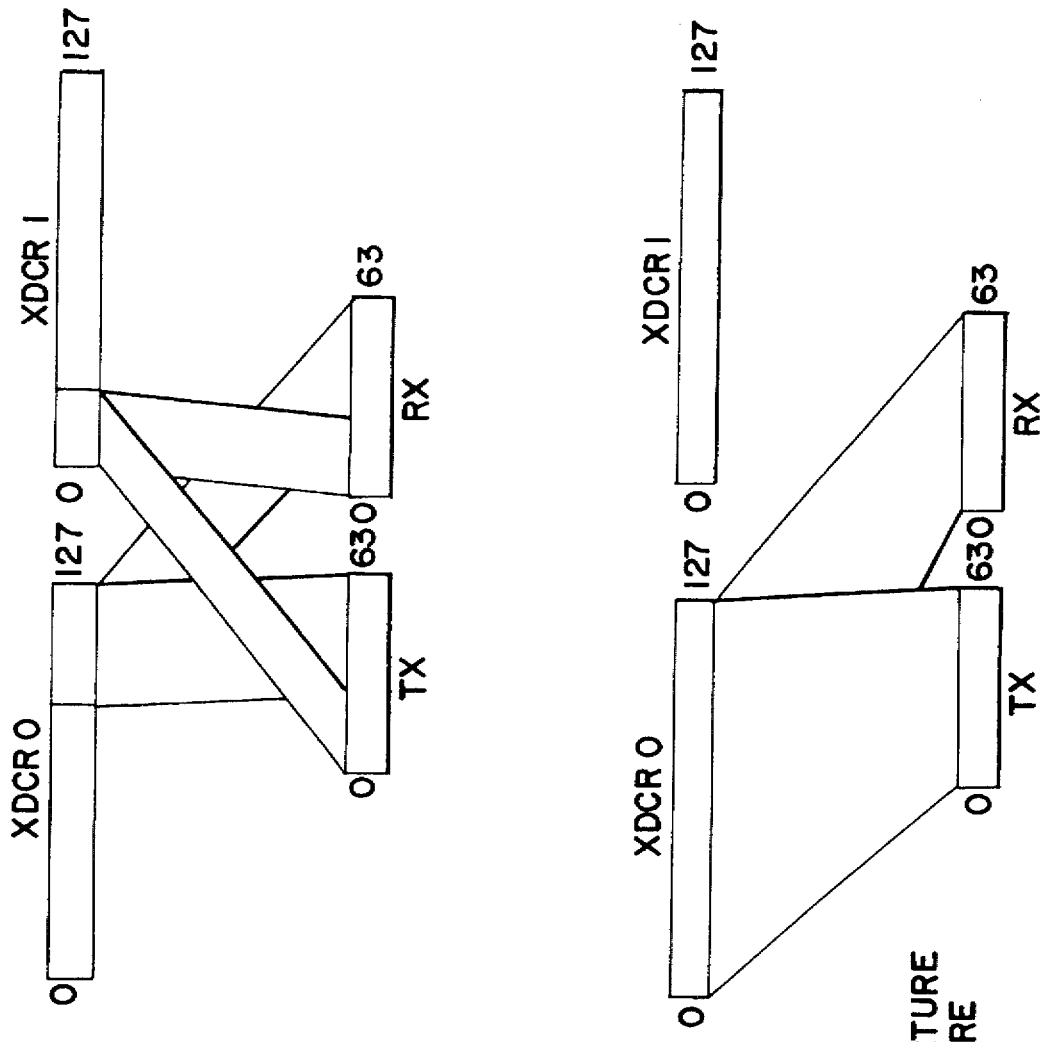
FIG. 12 illustrates an embodiment of multiplexer connectivity patterns of the configuration of FIG. 11.

FIG. 11 depicts another preferred configuration of independent transmit and receive multiplexers with adjacent element shorting capability for an N=64 processing channel beamforming system and M=128 element transducers. The calibration connections have been omitted for clarity. FIG. 12 provides examples of the variable aperture system multiplexer capability for this configuration. Again the ability to place the resulting 128 element aperture (64-shorted-element pairs) anywhere within either transducer is retained, as is the capability to select the transmit and receive apertures independently. Note that the adjacent element shorting is achieved by using additional multiplexer modules over the configuration of FIG. 9, so the shorting capability is not hardwired, but is achieved by programming the multiplexer to electronically switch, or link, two elements (in the case of FIG. 11) into a common signal path to a transmit processing channel or a receive processing channel.

Figure 13:
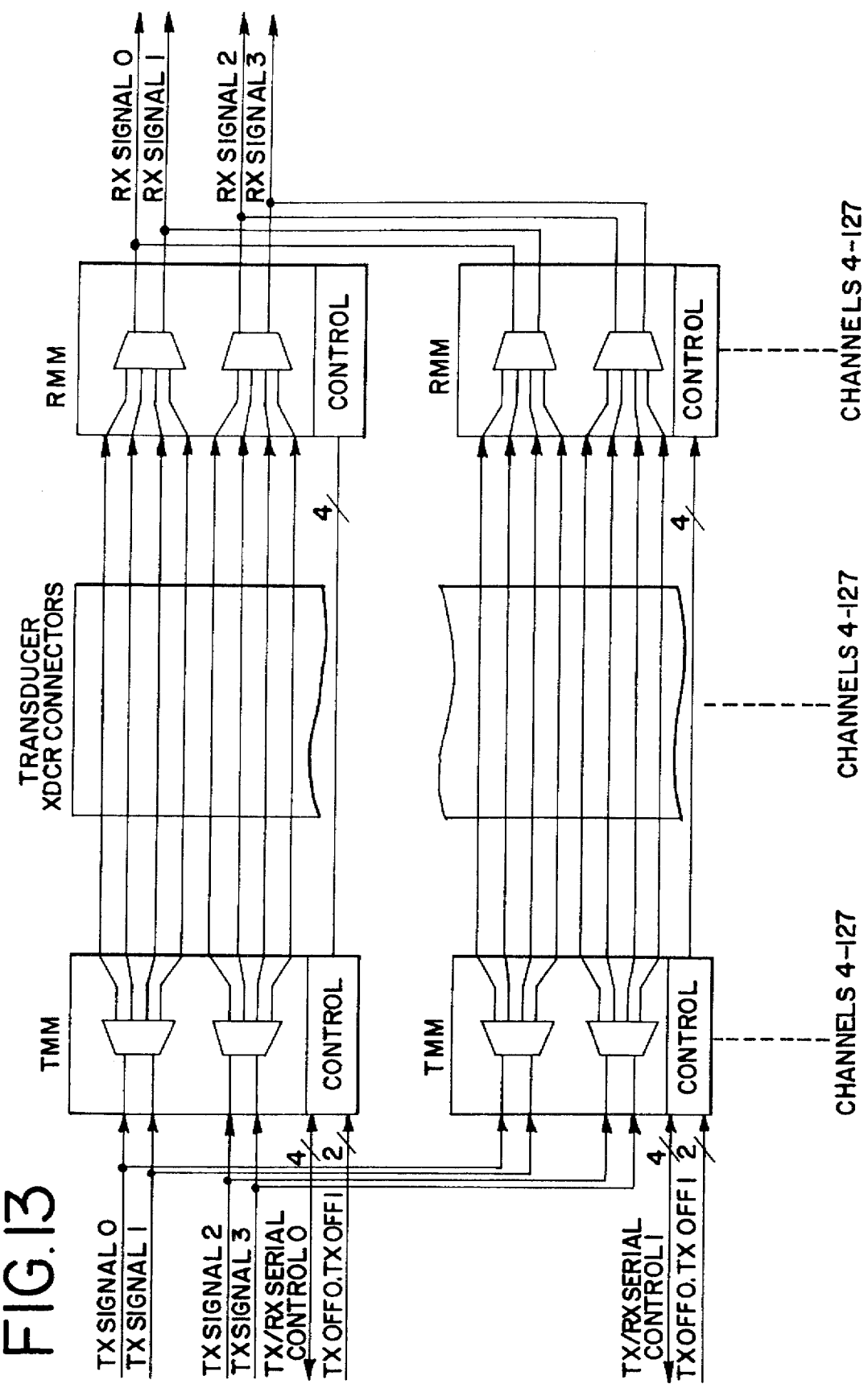
FIG. 13 is a preferred configuration for transmit and receive multiplexers for a N=128 processing channel imaging system with two 128-element transducers and one 128× 3-element elevational transducer with 256 connections (M=128×2 because outer elements are grouped and connected internally by pairs).
Figure 14:
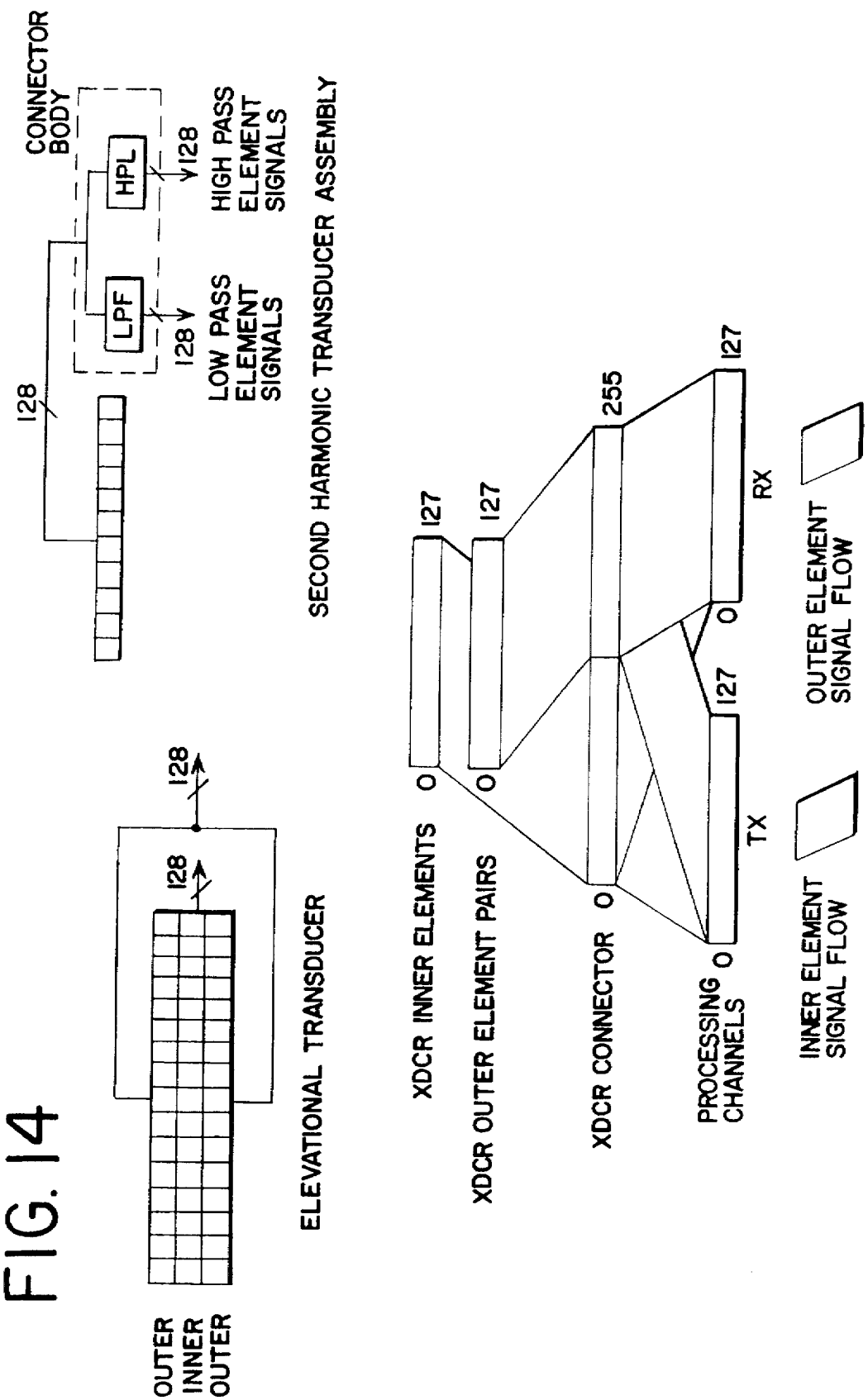
FIG. 14 illustrates an embodiment of multiplexer connectivity patterns of the configuration of FIG. 13 using the elevational transducer shown as an inset. Also shown is a 128-element transducer modified by low-pass and high-pass filtering for use in second harmonic imaging in which the resultant 256-signal-connections may also use the same multiplexer configuration as the elevational transducer.

FIG. 13 depicts another preferred configuration of independent transmit and receive multiplexers for use with two 128 element transducers and a single 128×3 element transducer on a N=128 processing channel beamforming system for elevational beamforming, described in more detail in the next section. The physical layout of the transducer is depicted as an inset on FIG. 14. The outside elements are connected in pairs within the transducer head to yield a net M=256 element transducer, which uses a 256 pin connector. Only switches for the inner line of elements will be closed for scan lines with a shallow focal depth and switches for both inner and outer elements will be closed for scan lines with a greater focal depth. When both inner and outer elements are active, both transmit and receive multiplexers are switched to drive both the inner and outer elements simultaneously or to receive both inner and outer simultaneously (a type of multiplexer shorting). This variable aperture system configuration can also support a 256×1 element transducer, and operates as suggested by FIG. 14 by associating elements 0–127 with the label "inner" and elements 128–255 with the label "outer". The multiplexer configurations will allow a continuous sliding aperture that is 128 elements in width to move across the full transducer aperture.

Another transducer that can use the configuration of FIG. 13 is a 128×2 element transducer with built-in diplexer filters for use in second harmonic imaging. The physical layout of the transducer is depicted as an inset on FIG. 14. The physical transducer array is 128×1 elements, but the diplexer separates the individual element signals by passage through low pass and high pass filters, creating a total of 256 signal channels from the transducer assembly.

SCANNING MODES

Preferably at least three basic scanning modes are supported, termed direct aperture mode, sliding aperture mode, and synthetic aperture mode. In the direct aperture mode, there is a one-to-one relationship between processing channels and transducer elements (or adjacent multiplexer-shorted element pairs). In the sliding aperture and synthetic aperture modes, there are more transducer elements or transducer output signals than there are processing channels. In the sliding aperture mode, a sequence of scan lines is formed as the aperture effectively slides down the transducer. In the synthetic aperture mode, a complete scan line is built by coherently summing the result of multiple excitations.

Figure 15:
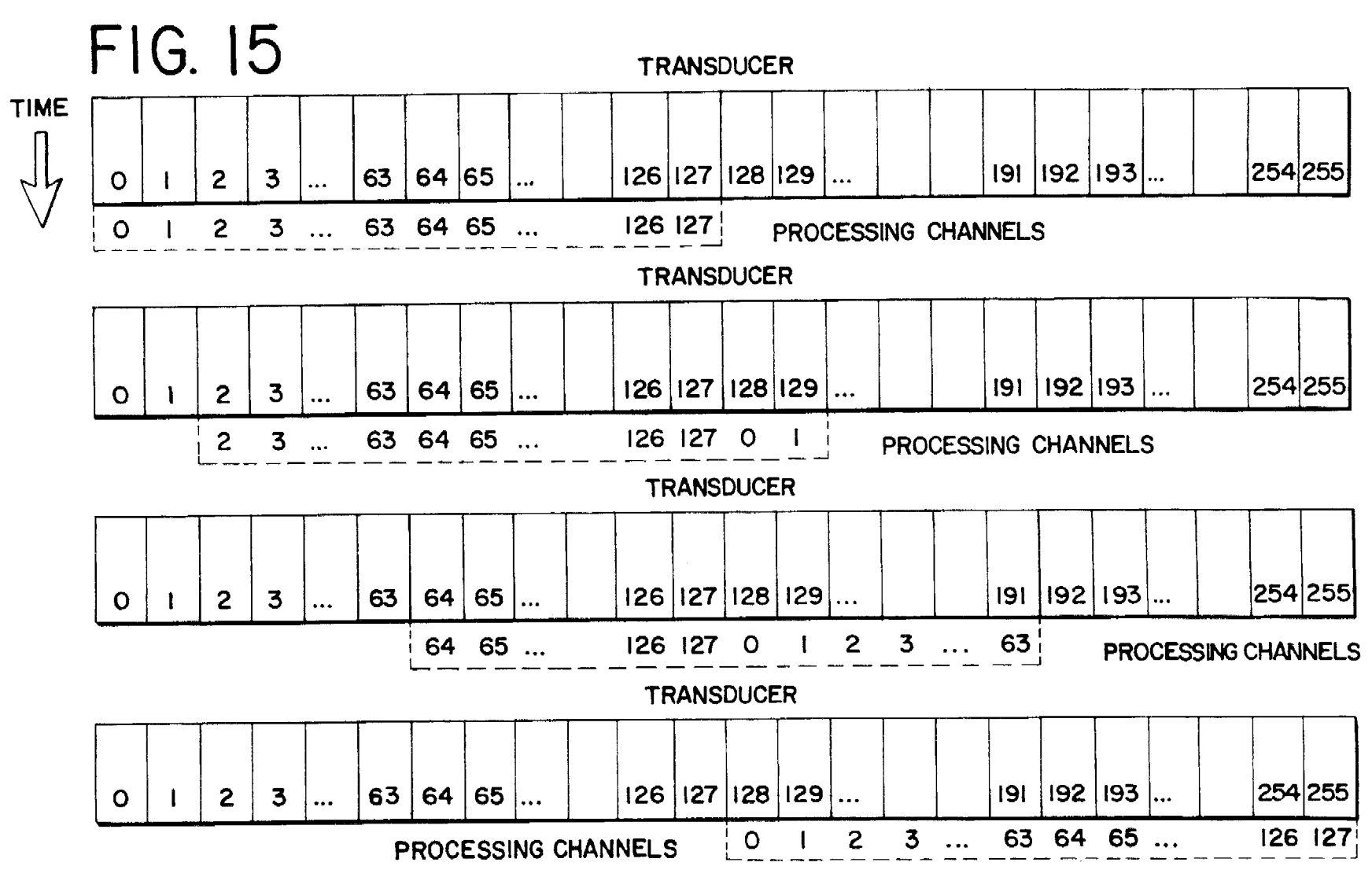

The direct aperture mode requires no aperture switching at all. All transducer pins are simply connected to the processing channels of the transmit and receive beamformers. An example of how the sliding aperture mode works with a 256-element array and using the configuration of FIG. 8 is illustrated by FIG. 15. Use of the sliding aperture permits a larger field of view to be acquired from a physically larger transducer aperture, such as that of a 256×1 transducer. In the preferred embodiment, the smallest step in the slide is two elements, although single elements steps are within the scope of the invention.

Figure 16:
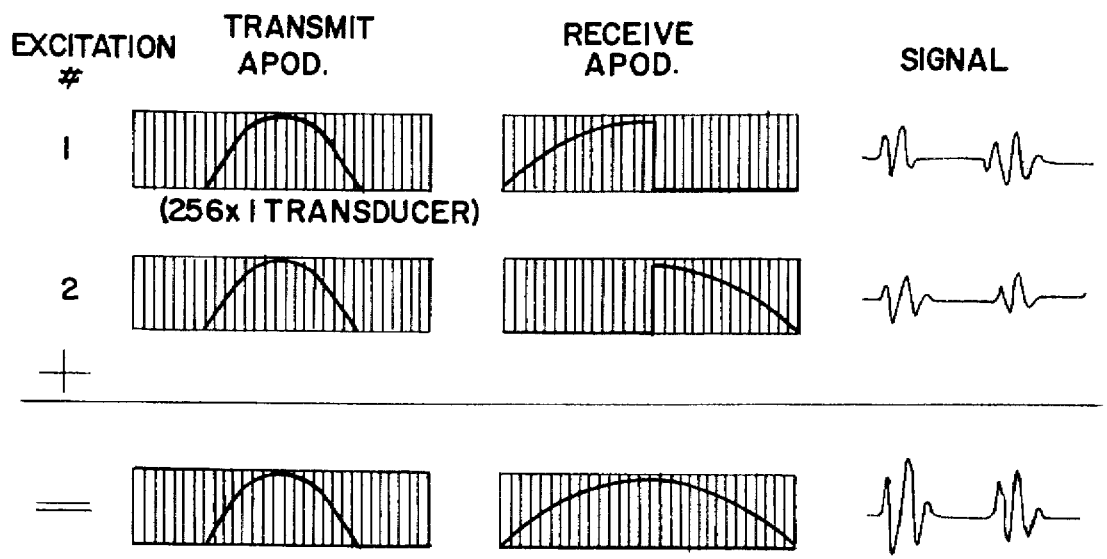
FIG. 16 depicts preferred transmit and receive sub-aperture patterns selected by the transmit and receive multiplexers of the invention for a two-excitation-event synthetic aperture acquisition.

In the synthetic aperture mode, each receive beam is acquired in at least two separate firings of the transmit beamformer. FIG. 16 illustrates the apodization and active elements (where apodization not zero) selected for a two-excitation azimuthal synthetic aperture acquisition of a M=256 element linear transducer array with a beamforming system of N=128 processing channels, which could be supported by the FIG. 8 configuration of multiplexers. Here, P=2 because M=2N. In this example, the transmit aperture is the same in each excitation and the receive aperture toggles between the left and right halves of the transducer array. Thus, this forms a receive synthetic aperture. Maintaining a fixed transmit aperture that is smaller than the receive aperture is often intentional in order to improve the depth of field during formation of a fixed focus transmit beam. During the first firing, transmit multiplexer connects the 128 transmitters to the center elements 64–191 and the receive multiplexer connects the 128 receivers to the left subarray, elements 0–127. During the second firing, transmit multiplexer still connects the transmitters to central elements 64–191, but the receive multiplexer connects the 128 receivers to the right subarray, elements 128–255. The in-phase/quadrature (I/Q) signals out of the post-beamformation baseband processor and optional coherent image synthesis system for two excitations are coherently summed by summer R-280 (FIG. 2a) to form the final composite receive beam signal. A scan line buffer R-282 (FIG. 2a) retains the sampled beam signal of the first excitation response to be added to the sampled beam signal of the second excitation response to form the final receive synthetic aperture beam signal.

Figure 17:
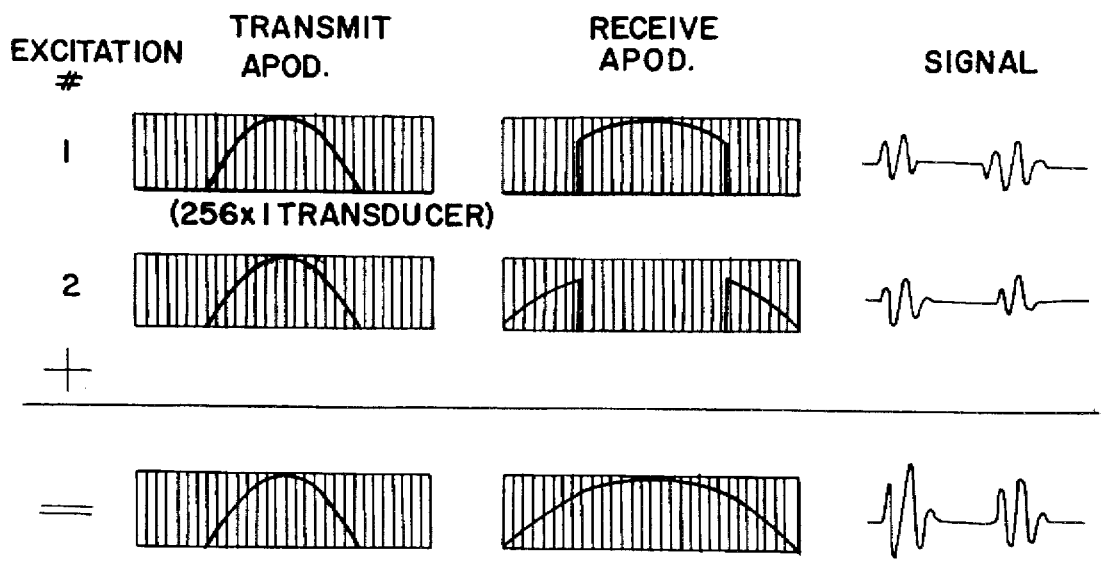
FIG. 17 depicts alternative transmit and receive sub-aperture patterns selected by the transmit and receive multiplexers of the invention for a two-excitation-event synthetic aperture acquisition.

FIG. 17 illustrates an alternative two-excitation acquisition scenario also capable of being supported by the FIG. 8 configuration, in which the receive aperture is divided into a central subarray of elements 64–191 and a split subarray pair of outer elements (0–63 and 192–255).

Figure 18:
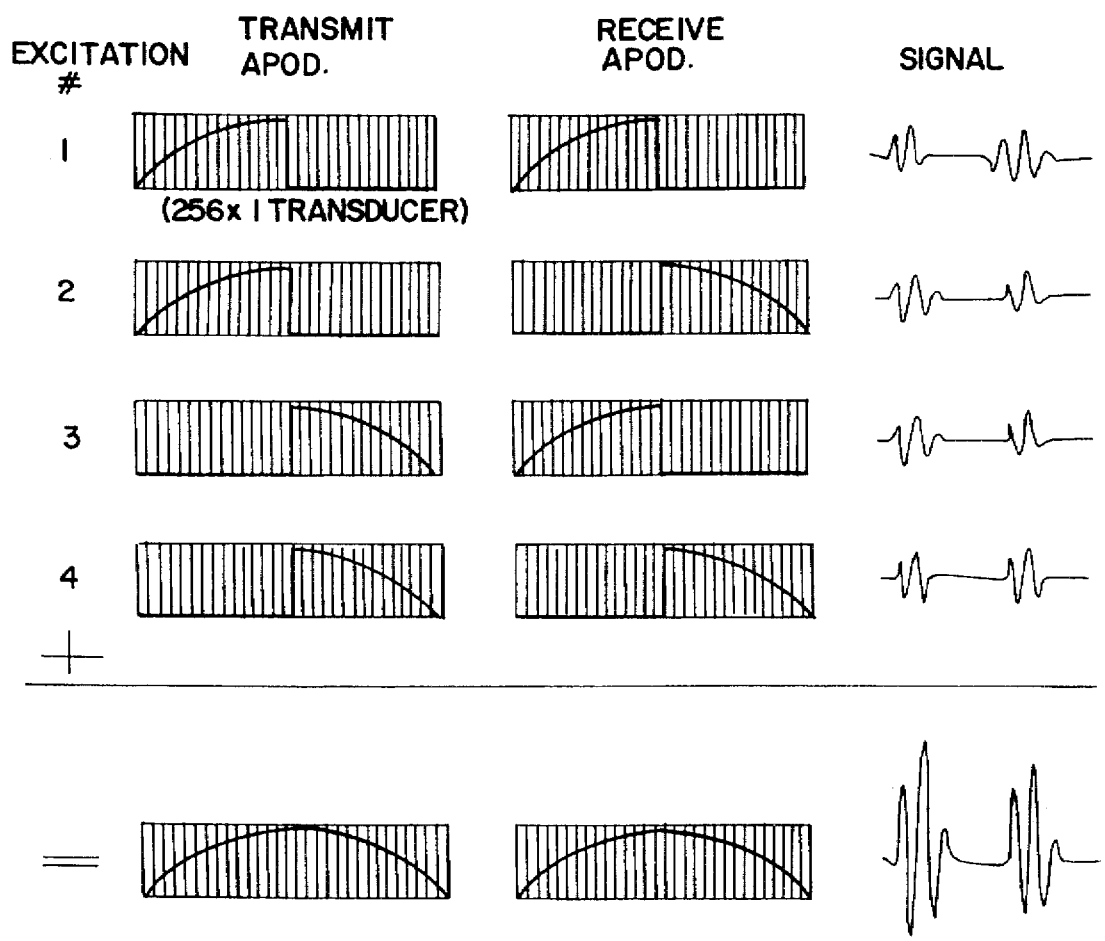
FIG. 18 depicts one preferred transmit and receive sub-aperture patterns selected by the transmit and receive multiplexers of the invention for a four-excitation-event synthetic aperture acquisition in which the full transmit and full receive synthetic apertures are acquired.

To create a synthetic aperture of highest two-way beam resolution, both transmit and receive synthetic apertures can be acquired. This is accomplished with a four excitation acquisition as illustrated in FIG. 18.

FIG. 19 illustrates a synthetic aperture acquisition using an elevational transducer that is also supported by the variable aperture configuration of FIG. 13. Shown is the case of a 128-channel beamformer system and a 128×2 elevational transducer (see FIG. 14). The advantage of this mode is an improvement in the elevational resolution within the near field of the transducer. In a two-excitation synthetic aperture scan mode, the transmit multiplexer selects for the aperture either the central elements by themselves or the central plus outer elements tied together by the multiplexer.

Figure 20:
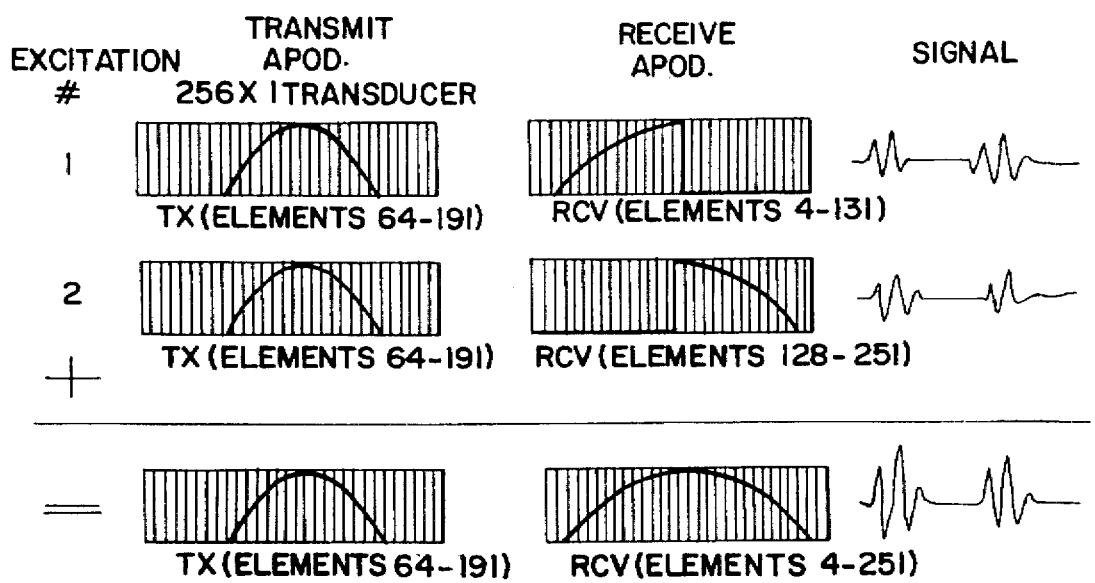
FIG. 20 depicts preferred transmit and receive aperture patterns selected by the transmit and receive multiplexers of the invention for two-excitation-event synthetic aperture acquisition with adaptive focusing operations enabled.

FIG. 20 illustrates a variation on the synthetic aperture acquisition of FIG. 16, that is advantageous for adaptive focusing purposes. A preferred aperture overlap of four elements between the two receive subarrays, as shown on FIG. 20, is selected for the receive multiplexers. An aberration delay profile across the transducer array, to be used to correct the focusing delay profile used in beamforming, is estimated by determining the inter-subarray phase differences using crosscorrelation of adjacent 4-element subarrays. A detailed description of the system is given in the co-pending application entitled METHOD AND APPARATUS FOR REAL-TIME, CONCURRENT ADAPTIVE FOCUSING IN AN ULTRASOUND BEAMFORMER IMAGING SYSTEM. Without the aperture overlap, there would not be temporal data for producing the adjacent-subarray crosscorrelation measurement. The left-half subarray and right-half subarray synthetic aperture acquisition is the preferred approach for operational modes involving adaptive focusing, rather than the central and two outer subarray approach. A synthetic aperture acquisition such as depicted in FIG. 17 would be a disadvantage for use with adaptive focusing because two overlap regions (a total of 8 elements) would be required, which further reduces the receive aperture size.

We claim:

1. An ultrasonic imaging system for imaging an object comprising:

a plurality of transducer arrays, wherein the transducer arrays have a plurality of ultrasonic transducer elements;

a transmit multiplexer coupled between the transmitter and the transducer arrays to selectively connect a set of the transducer arrays to the transmitter;

a separate receive multiplexer coupled between the receiver and the transducer array to selectively connect a set of the transducers to the receiver to thereby enable independent placement of transmit and receive apertures within the transducer arrays.

2. An ultrasonic imaging system comprising:

a transducer array having a plurality of E connections to transducer elements;

a plurality of T transmitter for transmitting insonifying signals to transducer elements;

a plurality of R receives for receiving echo signals from transducer elements;

a transmit multiplexer coupled to the transmitters and further coupled to a first plurality of first groups of connections to transducer elements, each first group composed of T connections to transducer elements;

a receive multiplexer coupled to the receivers and further coupled to a second plurality of second groups of connections to transducer elements, each second group composed of R connections to transducer elements; and control circuitry to cause the transmit multiplexer to selectably link the transmitters to one of the first plurality of first groups of connections to transducer elements, and further to cause the receive multiplexer to selectively link the receivers to one of the second plurality of second groups of connections to transducer elements.

3. The ultrasonic imaging system of claim 2 wherein the selected first group of connections to transducer elements for linkage to the transmitters has at least one element not in common with the selected second group of connections to transducer elements for linkage to the receivers.

4. The ultrasonic imaging system of claim 2 wherein the number of receivers R is equal to the number of transmitters T, and wherein the first group of connections to transducer elements is identical to the second group of connections to transducer elements.

5. The ultrasonic imaging system of claim 2 wherein the control circuitry is operable to change the selected linkage at least once per transmit event.

6. The ultrasonic imaging system of claim 2 further comprising coupling circuitry to the connections to transducer elements that enables insertion of calibrating signals to at least one of the connections.

7. The ultrasonic imaging system of claim 6 wherein a calibrating signal is inserted at a connection and selectively coupled by the control circuitry to a receiver, and further the relative amplitude and phase of the received signal with respect to the calibrating signal is saved as receiver calibration values relative to the selected connection.

8. The ultrasonic imaging system of claim 2 wherein one of the transmitters is selected for transmission, the transmitters is selected for transmission, the transmitted signal is selectively coupled by the control circuitry through the transmit multiplexer, coupled through the receive multiplexer, and coupled to a designated receiver.

9. The ultrasonic imaging system of claim 8 wherein each transmitter is fired in sequence and the signal measured by the designated receiver, and further the relative amplitude and phase differences among the transmitter signals is saved as transmitter calibration values.

10. The ultrasonic imaging system of claim 2 wherein the transducer has E=E1+2*E2 elements and the 2*E2 are paired to E2 common connections, and further the T (or R) transmitters (receivers) may be connected to at least one of the E, E1, E2 connections (elevational transducer case).

11. An ultrasonic imaging system comprising:
 a plurality of transducer arrays, a given transducer array having a plurality of connections to transducer elements of the given array;
 a plurality of T transmitters for transmitting insonifying signals to transducer elements of at least a one of the plurality of transducer arrays;
 a plurality of R receivers for receiving echo signals from transducer elements of at least a one of the plurality of transducer arrays;
 a transmit multiplexer coupled to the transmitters and further coupled to a first plurality of first groups of connections to transducer elements, each first groups composed of T connections to transducer elements of at least one of the plurality of transducer arrays;
 a receive multiplexer coupled to the receivers and further coupled to a second plurality of second groups of connections to transducer elements, each second group composed of R connections to transducer elements of at least one of the plurality of transducer arrays; and
 control circuitry to cause the transmit multiplexer to selectably link the transmitters to one of the first plurality of first groups of connections to transducer elements, and further to cause the receive multiplexer to selectively link the receivers to one of the second plurality of second groups of connections to transducer elements.

12. An ultrasonic imaging system for imaging an object comprising:
 a transducer array having a plurality of ultrasonic transducer elements;
 a transmit beamformer for providing transmit signals to energize the transducer elements;
 a receive beamformer for processing received signals from the transducer elements;
 a transmit multiplexer coupled between the transmit beamformer and the transducer array to selectively connect a first group of the plurality of transducer elements in the array to the transmit beamformer; and
 a receive multiplexer coupled between the receive beamformer and the transducer array to selectively connect a second group of the plurality of transducer elements in the array to the receive beamformer.

13. The ultrasonic imaging system of claim 12 wherein the number of transducer elements in the first group is different than the number of transducer elements in the second group.

14. The ultrasonic imaging system of claim 12 wherein the number of transducer elements in the first group is identical to the number of transducer elements in the second group.

15. The ultrasonic imaging system of claim 12 wherein the first group of transducer elements contains at least one element not in the second group of transducer elements.

16. The ultrasonic imaging system of claim 12 wherein the first group of transducer elements is identical to the second group of transducer elements.

17. The ultrasonic imaging system of claim 12 further comprising a control which is operative to change, prior to each transmit event, the selection of elements in at least one of the first group of transducer elements and the second group of transducer elements.

18. The ultrasonic imaging system of claim 12 further comprising:
 a plurality of transducer signal paths coupled between the transducer array and the transmit multiplexer, wherein each transducer signal path couples a transducer element to the transmit multiplexer; and
 a plurality of transmit beamformer signal paths coupled between the transmit beamformer and the transmit multiplexer.

19. The ultrasonic imaging system of claim 18 wherein the transmit multiplexer is operative to connect a selected transducer signal path to a selected transmit beamformer signal path.

20. The ultrasonic imaging system of claim 18 wherein the transmit multiplexer is operative to connect at least two selected transducer signal paths to a selected transmit beamformer signal path.

21. The ultrasonic imaging system of claim 12 further comprising:
 a plurality of transducer signal paths coupled between the transducer array and the receive multiplexer, wherein each transducer signal path couples a transducer element to the receive multiplexer; and
 a plurality of receive beamformer signal paths coupled between the receive beamformer and the receive multiplexer.

22. The ultrasonic imaging system of claim 21 wherein the receive multiplexer is operative to connect a selected transducer signal path to a selected receive beamformer signal path.

23. The ultrasonic imaging system of claim 21 wherein the receive multiplexer is operative to connect at least two selected transducer signal paths to a selected receive beamformer signal path.

24. The ultrasonic imaging system of claims 20 or 23 wherein the at least two selected transducer element paths are associated with adjacent transducer elements in the array.

25. The ultrasonic imaging system of claims 20 or 23 wherein the transducer array is an elevational transducer comprising:
 an inner group of transducer elements arranged along a central axis;
 an outer group of transducer elements symmetrically arranged about the central axis of the inner group; and
 further wherein the at least two selected transducer signal paths include at least a signal path from the inner group and at least a signal path from the outer group.

26. The ultrasonic imaging system of claim 12 wherein the transducer array is a second harmonic transducer, the system further comprising:
 a first filter means coupled to the plurality of transducer elements and operative to pass ultrasonic frequencies of a first frequency range; and
 a second filter means coupled to the plurality of transducer elements and operative to pass ultrasonic frequencies of a second frequency range.

27. The ultrasonic imaging system of claim 26 further comprising:
 a first plurality of transducer signal paths coupled between the first filter means and the receive multiplexer;
 a second plurality of transducer signal paths coupled between the second filter means and the receive multiplexer; and
 a plurality of receive beamformer signal paths coupled between the receive beamformer and the receive multiplexer.

28. The ultrasonic imaging system of claim 27 wherein the receive multiplexer is operative to connect a transducer signal path, selected from the first plurality and the second plurality, to a selected receive beamformer signal path.

29. The ultrasonic imaging system of claim 12 wherein at least one of the transmit multiplexer and the receive multiplexer sequentially selects, in association with a sequence of transmit events, groups of transducer elements that form a sequence of apertures.

30. The ultrasonic imaging system of claim 29 wherein:

the transducer array is a linear array transducer; and the sequence of apertures are formed unidirectionally along the transducer array.

31. The ultrasonic imaging system of claim 29 wherein the receive beamformer produces, for each transmit event, a receive beamformer output signal, and said system further comprises:

a summer for summing the receive beamformer output signals to form a summed output signal.

32. The ultrasonic imaging system of claim 31 wherein at least two of the groups of transducer elements in the sequence of apertures are identical.

33. The ultrasonic imaging system of claim 31 wherein a transmit aperture associated with a first and a second transmit event is formed from a set of transducer elements substantially centered within the array, and a receive aperture associated with the first transmit event and a receive aperture associated with the second transmit event are formed from distinct sets of transducer elements.

34. The ultrasonic imaging system of claim 33 wherein a receive aperture is identical to the transmit aperture.

35. The ultrasonic imaging system of claim 31 wherein the transducer array comprises distinct first and second sets of transducer elements, and wherein four aperture pairs, each aperture pair consisting of a transmit aperture formed from one of said first and second sets and a receive aperture formed from one of said first and second sets, are selected in association with four sequential transmit events.

36. The ultrasonic imaging system of claim 35 wherein each of the four pairs of apertures are distinct from one another.

37. The ultrasonic imaging system of claim 31 wherein a transmit aperture associated with a first and a second transmit event is formed from a set of transducer elements substantially centered within the array, and a first receive aperture associated with the first transmit event and a second receive aperture associated with the second transmit event are formed from respective first and second sets of transducer elements, wherein the first and second sets include at least one element in common.

38. An ultrasonic imaging system for imaging an object comprising:

a plurality of transducer arrays, wherein the transducer arrays have a plurality of transducer elements;

a transmit beamformer for providing transmit signals to energize the transducer elements;

a receive beamformer for processing received signals from the transducer elements;

a transmit multiplexer coupled between the transmit beamformer and the transducer arrays to selectively connect a first group of the plurality of transducer elements to the transmit beamformer;

a receive multiplexer coupled between the receive beamformer and the transducer arrays to selectively connect a second group of the plurality of transducer elements to the receive beamformer.

39. An ultrasonic imaging system comprising:

a transducer array having a plurality of transducer elements;

a plurality of transmitters for transmitting ultrasonic signals to a first group of transducer elements;

a plurality of receivers for receiving echo signals from a second group of transducer elements;

a transmit multiplexer coupled to the transmitters and further coupled to the first group of transducer elements; and a receive multiplexer coupled to the receivers and further coupled to the second group of transducer elements.

40. The ultrasonic imaging system of claim 39 further comprising:

a plurality of transmitter signal paths coupled between the transmitters and the transmit multiplexer, wherein each transmitter signal path is associated with a transmitter, and a plurality of receiver signal paths coupled between the receivers and the receive multiplexer, wherein each receiver signal path is associated with a receiver.

41. The ultrasonic imaging system of claim 40 further comprising:

a plurality of transducer signal paths coupled between the first group of transducer elements and the transmit multiplexer, wherein each transducer signal path is associated with an element, and control circuitry to cause the transmit multiplexer to connect a selected transducer signal path and a selected transmitter signal path.

42. The ultrasonic imaging system of claim 41 wherein the control circuitry is operable to change the selected transducer signal path and the selected transmitter signal path at least once per transmit event.

43. The ultrasonic imaging system of claim 40 further comprising:

a plurality of transducer signal paths coupled between the second group of transducer elements and the receive multiplexer, wherein each transducer signal path is associated with an element, and control circuitry to cause the receive multiplexer to connect a selected transducer signal path and a selected receiver signal path.

44. The ultrasonic imaging system of claim 43 wherein the control circuitry is operable to change the selected transducer signal path and the selected receiver signal path at least once per transmit event.

45. The ultrasonic imaging system of claim 40 further comprising coupling circuitry adapted to couple a receiver calibrating signal to at least one of the receiver signal paths.

46. The ultrasonic imaging system of claim 45 further comprising receiver calibration control circuitry, wherein the control circuitry activates the receiver calibrating signal and enables a measurement of receiver calibration values, and the system further comprises means for storing the receiver calibration values.

47. The ultrasonic imaging system of claim 40 further comprising:

a plurality of inter-multiplexer signal paths coupled between the transmit multiplexer and the receive multiplexer, and control circuitry to cause the transmit multiplexer and the receive multiplexer to connect a selected transmitter signal path, a selected inter-multiplexer signal path, and a selected receiver signal path associated with a receiver designated for transmitter calibration.

48. The ultrasonic imaging system of claim 47 wherein the control circuitry activates a transmission into the selected transmitter signal path and enables a measurement of transmitter calibration values by the receiver designated for transmitter calibration, and the system further comprises means for saving the transmitter calibration values.

49. The ultrasonic imaging system of claim 39 wherein the first group of transducer elements has at least one element not in common with the second group of transducer elements.

50. The ultrasonic imaging system of claim 39 wherein the number of receivers is equal to the number of transmitters, and wherein the first group of transducer elements is identical to the second group of transducer elements.

51. An ultrasonic imaging system comprising:

- a plurality of transducer arrays having a plurality of transducer elements;
- a plurality of transmitters for transmitting ultrasonic signals to a first group of transducer elements;
- a plurality of receivers for receiving echo signals from a second group of transducer elements;
- a transmit multiplexer coupled to the transmitters and further coupled to the first group of transducer elements;
- a receive multiplexer coupled to the receivers and further coupled to the second group of transducer elements;
- control circuitry to cause the transmit multiplexer to selectably provide signal paths from the transmitters to the first group of transducer elements, and further to cause the receive multiplexer to selectively provide signal paths from the receivers to the second group of transducer elements.

* * * * *